(12) United States Patent
Poggi et al.

(10) Patent No.: US 10,989,414 B2
(45) Date of Patent: Apr. 27, 2021

(54) FIRE PIT AND METHOD OF USE

(71) Applicant: Pyramid Firepits LLC, Portland, OR (US)

(72) Inventors: Sean Poggi, Lake Oswego, OR (US); Sean Rentenaar, Portland, OR (US)

(73) Assignee: Pyramid Firepits LLC, Portland, OR (US)

(*) Notice: Subject to any disclaimer, the term of this patent is extended or adjusted under 35 U.S.C. 154(b) by 0 days.

(21) Appl. No.: 17/012,019

(22) Filed: Sep. 3, 2020

(65) Prior Publication Data

US 2021/0063017 A1 Mar. 4, 2021

Related U.S. Application Data

(60) Provisional application No. 62/895,403, filed on Sep. 3, 2019.

(51) Int. Cl.
| | |
|---|---|
| *A47J 37/07* | (2006.01) |
| *F24B 1/18* | (2006.01) |
| *F24B 1/19* | (2006.01) |
| *F24C 3/08* | (2006.01) |
| *F24C 3/14* | (2006.01) |
| *F24B 1/182* | (2006.01) |

(Continued)

(52) U.S. Cl.
CPC ......... *F24B 1/1802* (2013.01); *A47J 37/0763* (2013.01); *F24B 1/182* (2013.01); *F24B 1/1902* (2013.01); *F24B 1/192* (2013.01); *F24B 1/193* (2013.01); *F24C 3/082* (2013.01); *F24C 3/14* (2013.01); *A47J 2037/0777* (2013.01)

(58) Field of Classification Search
CPC ...... F24B 1/1802; F24B 1/182; F24B 1/1902; F24B 1/192; F24B 1/193; A47J 37/0763; F24C 3/082; F24C 3/14
USPC .............................. 126/9 B, 30, 43; 99/450
See application file for complete search history.

(56) References Cited

U.S. PATENT DOCUMENTS

| | | | |
|---|---|---|---|
| 4,508,094 A | * | 4/1985 | Hait .......................... F24C 1/16 126/9 B |
| 9,651,191 B1 | | 5/2017 | Grisham et al. |
| 9,657,950 B2 | | 5/2017 | Boucher |

(Continued)

FOREIGN PATENT DOCUMENTS

| | | |
|---|---|---|
| KR | 20170017153 A | 2/2017 |
| WO | WO 2017174137 | 10/2017 |

OTHER PUBLICATIONS

Fireflower Fire Pit by Deus Modern; Fieldshop by Garden & Gun; https://www.outdoorfurnitureideas.com.au/kindling-fire-pit.html, Jul. 18, 2019.

(Continued)

*Primary Examiner* — Avinash A Savani
(74) *Attorney, Agent, or Firm* — Holland & Hart LLP

(57) ABSTRACT

A pyramid fire pit. The fire pit includes a first trapezoidal side plate having a first hook and a first slot defined in opposing upper corners, a second trapezoidal side plate having a second hook and a second slot defined in opposing upper corners, and a third trapezoidal side plate having a third hook and a third slot defined in opposing upper corners. The first hook locks into the second slot, the second hook locks into the third slot, and the third hook locks into the first slot so that the three side plates define between themselves an inverted triangular pyramid-shaped cavity in which a fire can be built.

16 Claims, 24 Drawing Sheets

(51) Int. Cl.
*F24B 1/193* (2006.01)
*F24B 1/192* (2006.01)

(56) References Cited

U.S. PATENT DOCUMENTS

| | | | |
|---|---|---|---|
| D865,929 S | 11/2019 | Hughes | |
| 2010/0288261 A1* | 11/2010 | Jones | F24C 3/00 126/25 R |
| 2012/0111311 A1* | 5/2012 | Steck | F24C 3/14 126/81 |
| 2012/0204852 A1* | 8/2012 | Boucher | A47J 37/0763 126/30 |

OTHER PUBLICATIONS

Kindling Fire Pit; Outdoor & Indoor Portable Heating; https://www.outdoorfurnitureideas.com.au/kindling-fire-pit.html, Jul. 18, 2019.
Made O' Metal Ltd/Designed by Sizzle Creative; https://madeometal.co.uk/home/48-medium-tri-fire-pit-black.html, 2019.
Walmart; Red Ember Badan; https://www.walmart.com/ip/Red-Ember-Badan-34-in-Triangle-Iron-Wood-Burning-Fire-Pit-and-Optional-Spark-Screen/375187844, 2019.
GreyB Search Report re: Pyramid Fire Pit; Apr. 15, 2019.
Mysurvivalpack; The Core Bio Reactor; https://shop.mysurvivalpack.com/how-it-works, 2019.
Prettyia; Triangular Windshield Rack; https://www.amazon.com/Prettyia-Portable-Triangular-Windshield-Backpacking/dp/B07KCM3DX5, 2019.

\* cited by examiner

FIRE PIT AND METHOD OF USE

RELATED APPLICATIONS

This application claims priority from the Inventors' provisional patent application Ser. No. 62/895,403 titled "Pyramid Fire Pit" and filed Sep. 3, 2019, the entire contents of which are incorporated herein by this reference.

FIELD OF THE INVENTION

This invention is in the field of portable or collapsible enclosures for outdoor fires.

Background of Some Aspects of this Specification

There are many occasions when it is desired to build a fire outdoors. Campfires and barbecues are common examples. A campfire can be built simply by igniting a pile of wood on the ground, but it is difficult to control or contain such a fire, so some type of enclosure is usually employed. Rocks or other flame-proof materials may be arranged in a more-or-less circular layout to define an enclosure for wood or other combustible material to make a campfire. A back-yard barbecue typically uses a metal or brick fire enclosure and a grill or similar supporting element over the fire on which food to be barbecued can be placed. Charcoal, wood, or the like is positioned under the grill to make the fire. Some barbecue systems use gas burners fueled by, for example, propane or natural gas. Depending on weather, the enclosure not only supports the grill but also shields the fire from the wind.

Rocks or other naturally occurring flameproof materials may not be conveniently available, especially in a back-yard setting. Accordingly, various kinds of pre-manufactured enclosures are often used for barbecues and campfires even when not in a back yard. There are many variations of round or rectangular fire enclosures made of fireproof material. Sheet metal may be used for this purpose. Fireproof enclosures for fires are typically by nature heavy and bulky, and frequently are permanently installed.

Various kinds of portable barbecue pits are known. These are typically made of lighter-weight metal than permanent firepits, and some are sufficiently light-weight as to be readily moved about on wheels.

For camping or backpacking in remote locations, small gas or propane powered stoves are often used. These are sometimes light-weight and are often used for cooking small quantities of food,

Brief Summary of Some Aspects of this Specification

The inventors believe they have discovered various problems with existing outdoor fire arrangements. Small stoves do not give the warmth and pleasure of a campfire or even of a larger barbecue. Barbeques are often heavy and clumsy to move. Campfires built on open ground can be blown out or, worse, scattered by the wind. It may be difficult to find rocks or other materials to build a campfire. There is a need for a firepit that can easily be moved about, that does not take up a large amount of space, that does not create a hazard especially in the wind, and that can be used for many purposes such as without limitation barbecuing, creating biochar, or enjoying a campfire. There is also a need for such a firepit that can be utilized to provide differing types of fire, for example two or more among wood, charcoal, and gas fires. There is also a need for such a firepit that is more stable yet easy to collapse, transport, and assemble, and for such a firepit and accessories for differing uses, such as for example one or more among a solid firepit cover, a raised firepit screen cover, a gas burner, particularly one connectable to conventional portable propane containers, and one or more cooking gratings. There is also need for such a firepit and/or one or more of its components having an attractive appearance, enhancing enjoyment of their use.

Briefly and in general terms, a pyramid fire pit according to an embodiment includes a first trapezoidal side plate having a first hook and a first slot defined in opposing upper corners, a second trapezoidal side plate having a second hook and a second slot defined in opposing upper corners, and a third trapezoidal side plate having a third hook and a third slot defined in opposing upper corners. The first hook is locked into the second slot, the second hook is locked into the third slot, and the third hook is locked into the first slot whereby the three side plates define therebetween an inverted triangular pyramid-shaped cavity.

Each side plate may have an upper edge extending between its opposing upper corners, a lower edge shorter than the upper edge, a first intermediate edge forming approximately right angles with the upper and lower edges, and a second intermediate edge forming an acute angle with the upper edge and an obtuse angle with the lower edge.

The first slot may be formed in the first side plate adjacent the right angle between the upper and first intermediate edges. Similarly, the second slot may be formed in the second side plate adjacent the right angle between the upper and first intermediate edges, and the third slot may be formed in the third side plate in like manner. The first hook may be formed in the first side plate adjacent the acute angle between the upper and second intermediate edges, and the second and third hooks may be formed in like manner in the second and third side plates, respectively.

A plurality of air openings may be defined in any or all of the side plates to facilitate providing sufficient oxygen to a fire in the fire pit. The side plates may be made of sheet steel or other suitable fireproof material.

A triangular-shaped floor plate may be disposed in the inverted pyramid-shaped cavity. The floor plate may be sized to fit into the cavity at an intermediate point between an apex of the cavity at the bottom of the fire pit, and the top of the fire pit. The floor plate may define one or more air openings.

Some embodiments include a gas burner element. A support pipe may be coupled to, and in fluid-flow communication with, the gas burner element. The support pipe may be disposed in the opening in the floor plate. Suitable plumbing may be provided for propane or natural gas. The gas burner element may be formed of three straight arms, each arm being a pipe containing gas orifices. The arms are connected at their ends to define a triangular shape. Some gas burner elements may have two or even more concentric triangles, each triangle formed of three arms containing orifices and connected at their ends, with additional radial pipes to support the triangles and carry gas to them.

Some embodiments include a triangular cover sized to fit over the upper edges of the three side plates. The cover may be decorative or may be used to prevent fire or sparks from ejecting from upper end of the firepit or to deliberately choke off or reduce air flow to the fire, which may be used for a purpose such as putting the fire out or making biochar.

Some embodiments include a triangular grill sized to fit over the upper edges of the three firepit side plates, the grill comprising a frame and a plurality of grill elements disposed across the frame. An auxiliary grill, which may also be triangular, may be supported above a base triangular grill by a plurality of support rods that rest on or may be secured to the frame of the base triangular grill.

Some embodiments may include a triangular pyramid-shaped spark arrestor shaped to fit over the upper edges of the three side plates. The spark arrestor may have three triangular-shaped panels each having a frame and a wire mesh disposed in the frame. The frames may be connected with hinges to facilitate folding the spark arrestor flat when not in use. A detachable hinge may connect a first one of the panels with a second one of the panels so that the first panel may be removed for convenient viewing of the fire from one direction while shielding it in other directions. One or all of the frames may have lower lips shaped to fit over the upper edges of the trapezoidal side panels.

Some embodiments of the firepit and one or more firepit accessories may be readily and easily assembled, transported, shipped, and reassembled. Some embodiments may be long lasting and utilized a great many times.

Some embodiments of the firepit and one or more accessories may be particularly lightweight, such as when comprised partially or entirely of sufficiently fireproof composites or other lightweight materials.

Some embodiments of the firepit are more stable than prior art firepits, such as through one or more extensions of the firepit plates laterally outwardly from the triangular pit to abut a support surface, such as the ground. Such an extension may be integral with a firepit plate.

Some embodiments of the firepit provide an inverted pyramid structure from the lower end nearly completely up to the top edge of the firepit, which can, in some instances provide one or more of a more complete surrounding of any fire burning within the pit and more chock-off or reduction of air flow into the pit when a solid cover is placed over the top or upper edge of the pit.

There are other features, advantages, and problem solutions provided by one or more embodiments disclosed herein. These will become apparent as the specification proceeds. In this regard, however, it is to be understood that the scope of the invention is to be determined by the claims as issued and not by whether they address or provide an aspect because it is recited in the Background or this Summary section of this specification.

DETAILED DESCRIPTION

Figure 1:
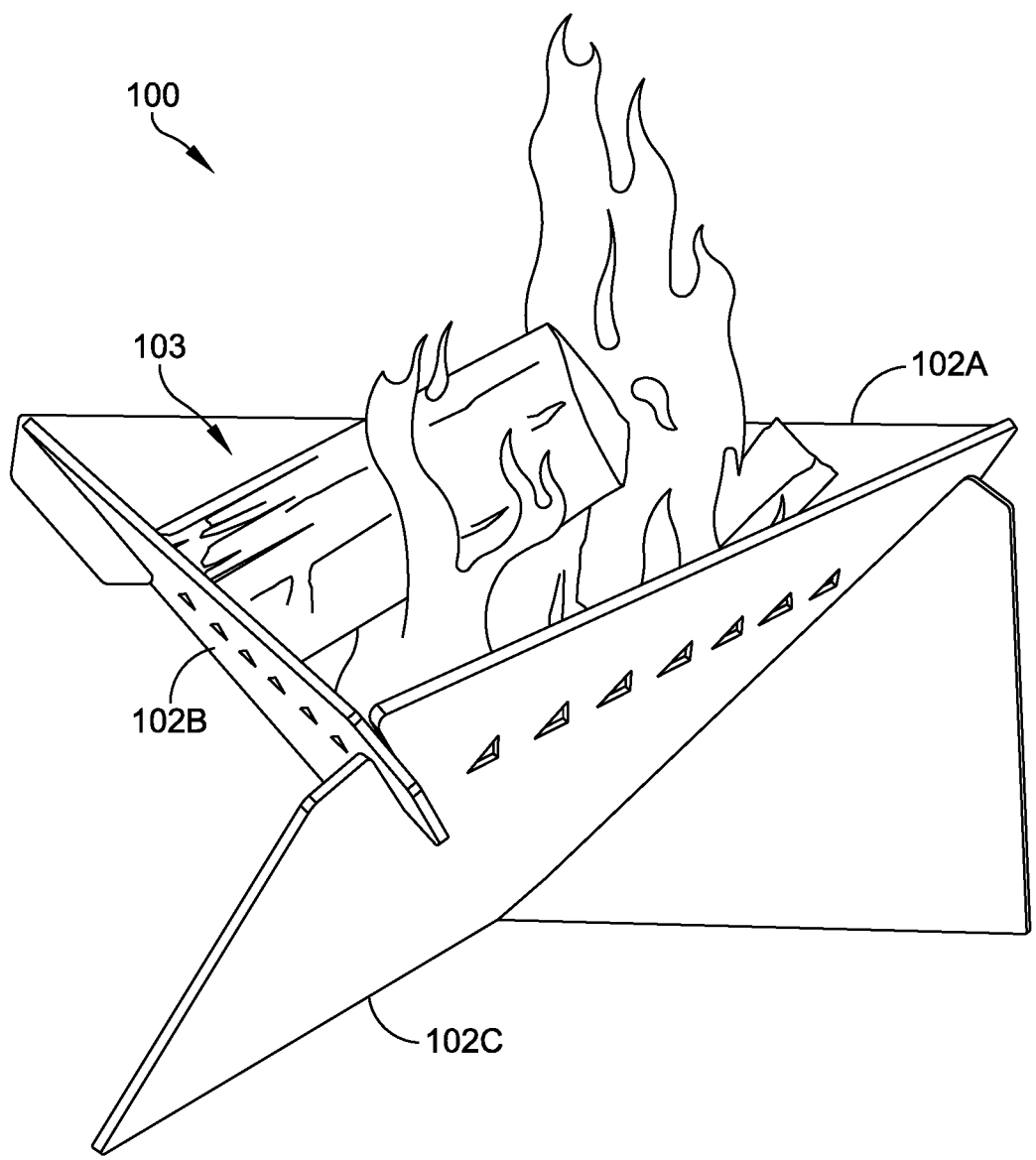
FIG. 1 is a perspective view of an embodiment of a pyramid fire pit enclosing a wood fire.
Figure 2:
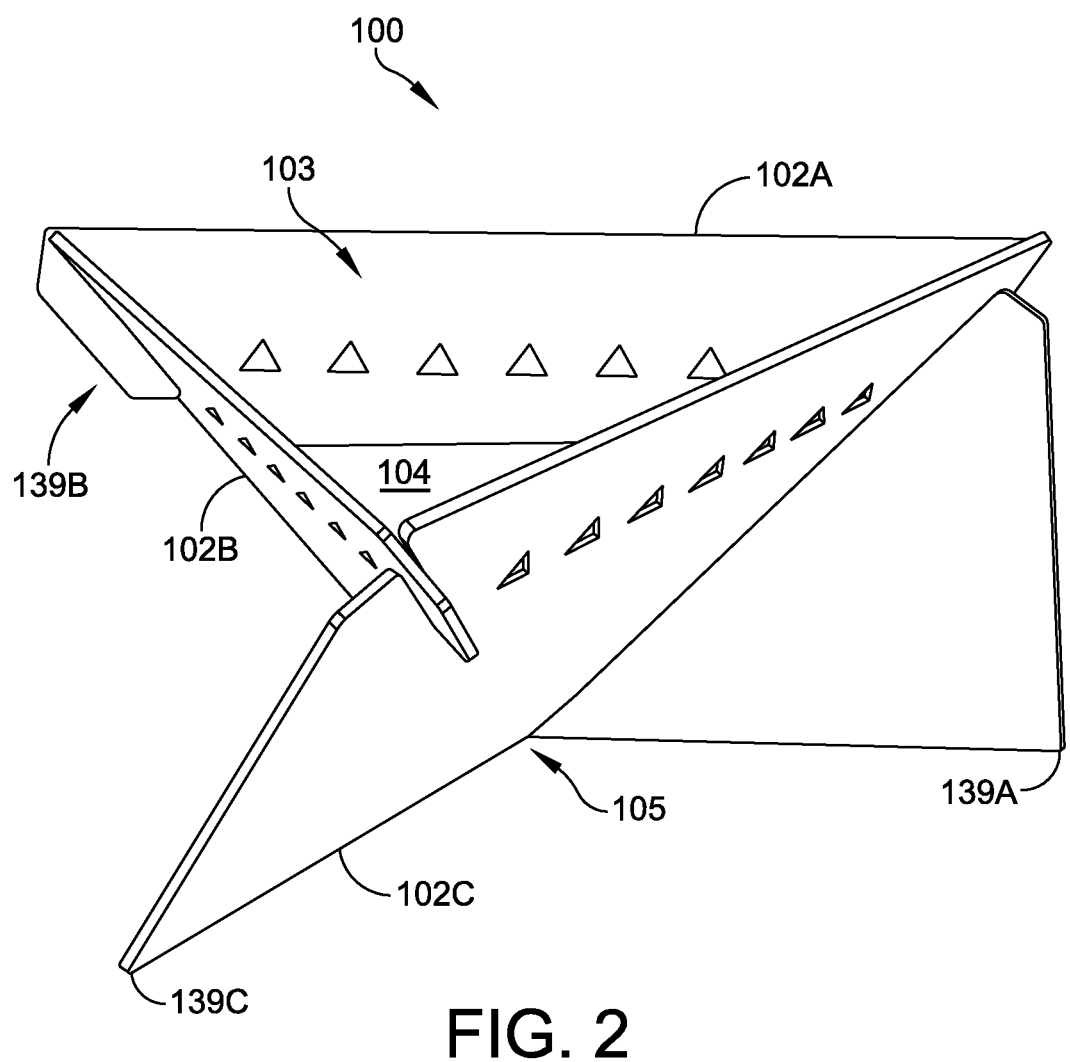
FIG. 2 is a perspective view of the pyramid fire pit of FIG. 1 but without the fire.
Figure 3:
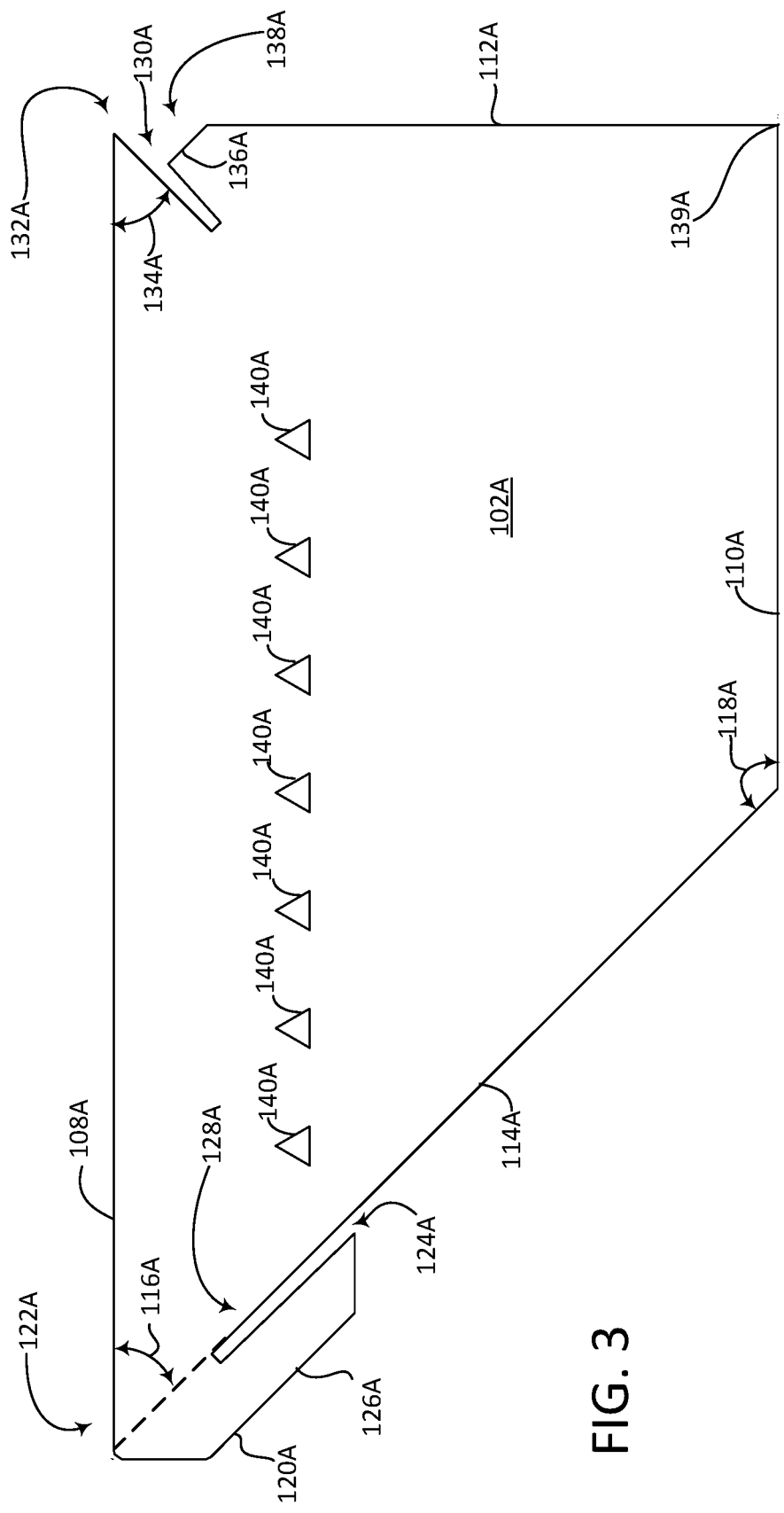
FIG. 3 is an enlarged side view of the side plate 102 of FIG. 2.

An embodiment of a pyramid fire pit generally 100 having first, second, and third trapezoidal side plates 102A, 102B, and 102C and a floor plate 104 is shown in FIGS. 1 and 2. The first side plate 102A, shown in detail in FIG. 3, has a relatively long top edge 108A and a relatively short bottom edge 110A parallel with the top edge 108A. A first intermediate edge 112A extends from the top edge 108A to the bottom edge 110A, the first intermediate edge 112A forming approximately perpendicular angles with the top and bottom edges. A second intermediate edge 114A extends from the top edge 108A to the bottom edge 110A, forming approximately a 45° angle 116A with the top edge 108A and approximately a 135° angle 118A with the bottom edge 310.

A hook 120A extends from a first corner 122A defined between the top edge 108A and the second intermediate edge 114A. An elongated channel 124A is formed between a lower extremity 126A of the hook 120A and a portion 128A of the second intermediate edge 114A.

A slot 130A is formed in a second corner 132A defined between the top edge 108A and the first intermediate edge 112A. The slot 130A extends into the first side plate 102A at approximately a 45° angle 134A between the slot 130A and the top edge 108A. An edge 136A of an upper extremity 138A of the first intermediate edge 112A is approximately perpendicular to the slot 130A.

A plurality of openings 140A are cut through the first side plate 102A to serve as vent holes for the fire that will be enclosed in the fire pit 100. In the embodiment shown, these openings are triangular in shape, but the shape of these openings is not critical and in other embodiments they may be round, square, or some other shape as desired, and there may be more or fewer of them than the seven openings depicted in FIG. 3.

The side plates 102B and 102C are similar to the side plate 102A. The side plates may be made of sheet steel or other suitable fireproof material. Some embodiments use sheet steel of 0.25-inch thickness for the three side plates. Some embodiments omit the floor plate, and some embodiments may use thinner material for the floor plate than for the side plates.

Figure 4:
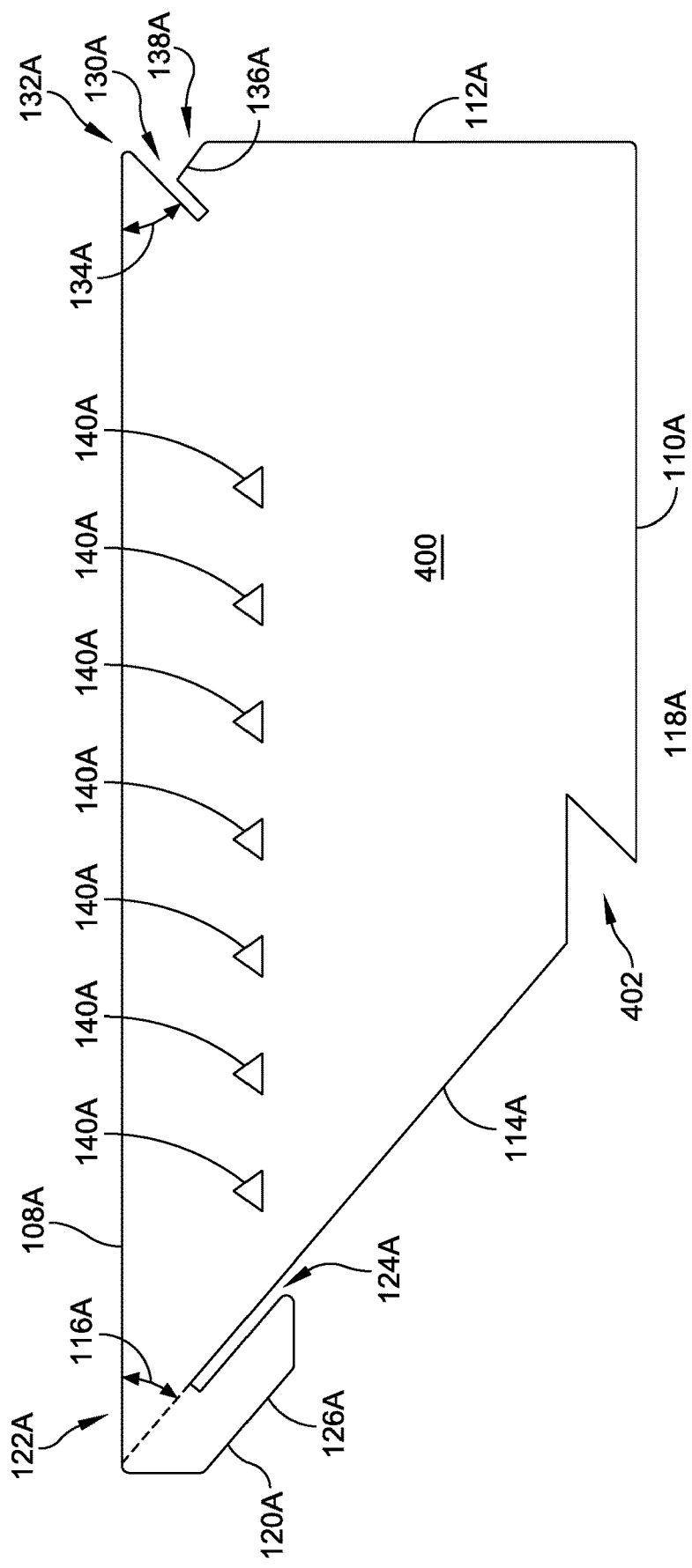
FIG. 4 is a side view of another embodiment of the side plate 102 of FIG. 2.

FIG. 4 shows an alternate embodiment 400 of a side plate similar to the side plate 102A except that it includes a cut-out 402 in the bottom edge 110A. This cut-out may be used for plumbing for a gas burner as will be explained presently, or to provide greater airflow into the firepit below the floor plate 104.

Figure 5:
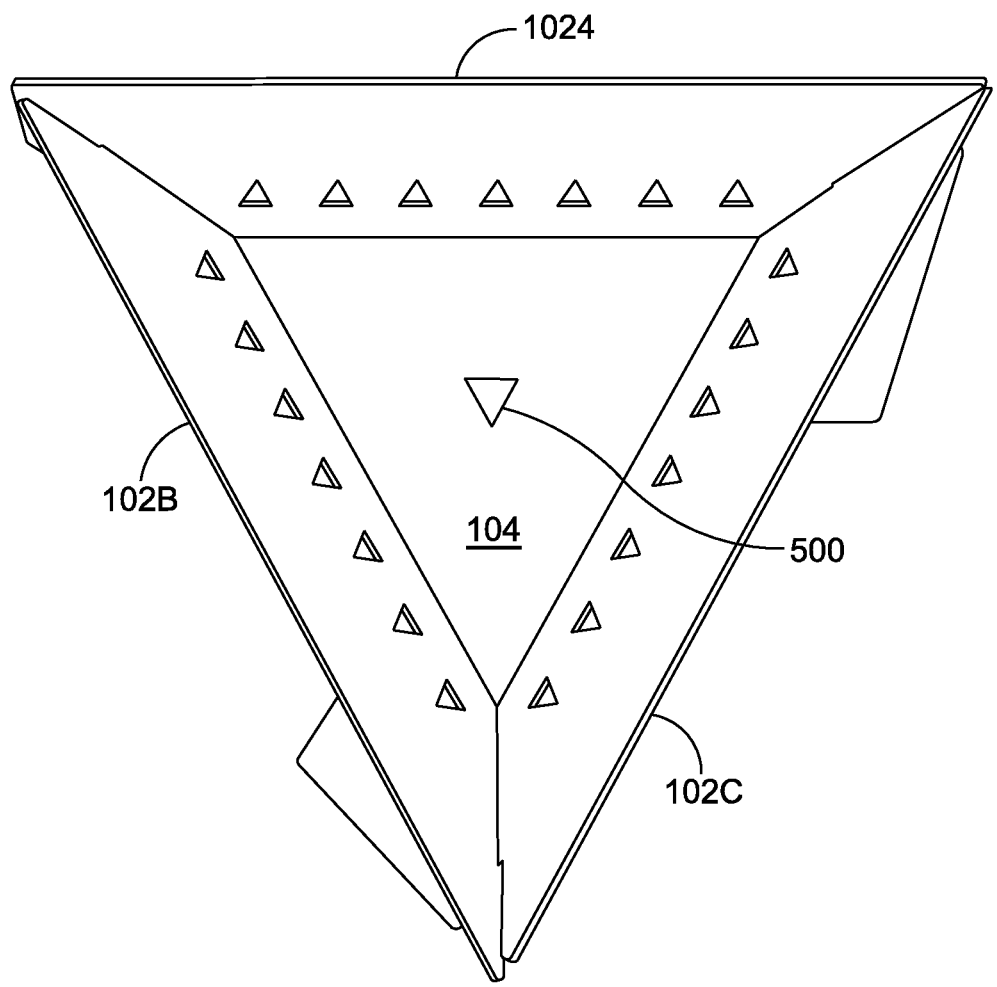
FIG. 5 is a top view of the pyramid fire pit of FIG. 2.

A top view of the pyramid fire pit is shown in FIG. 5. The floor plate 108 has an opening 500 that can admit air from below the floor plate and that can be used for a gas burner. In some embodiments the opening may be omitted, and in other embodiments there may be more than one opening.

Figure 6:
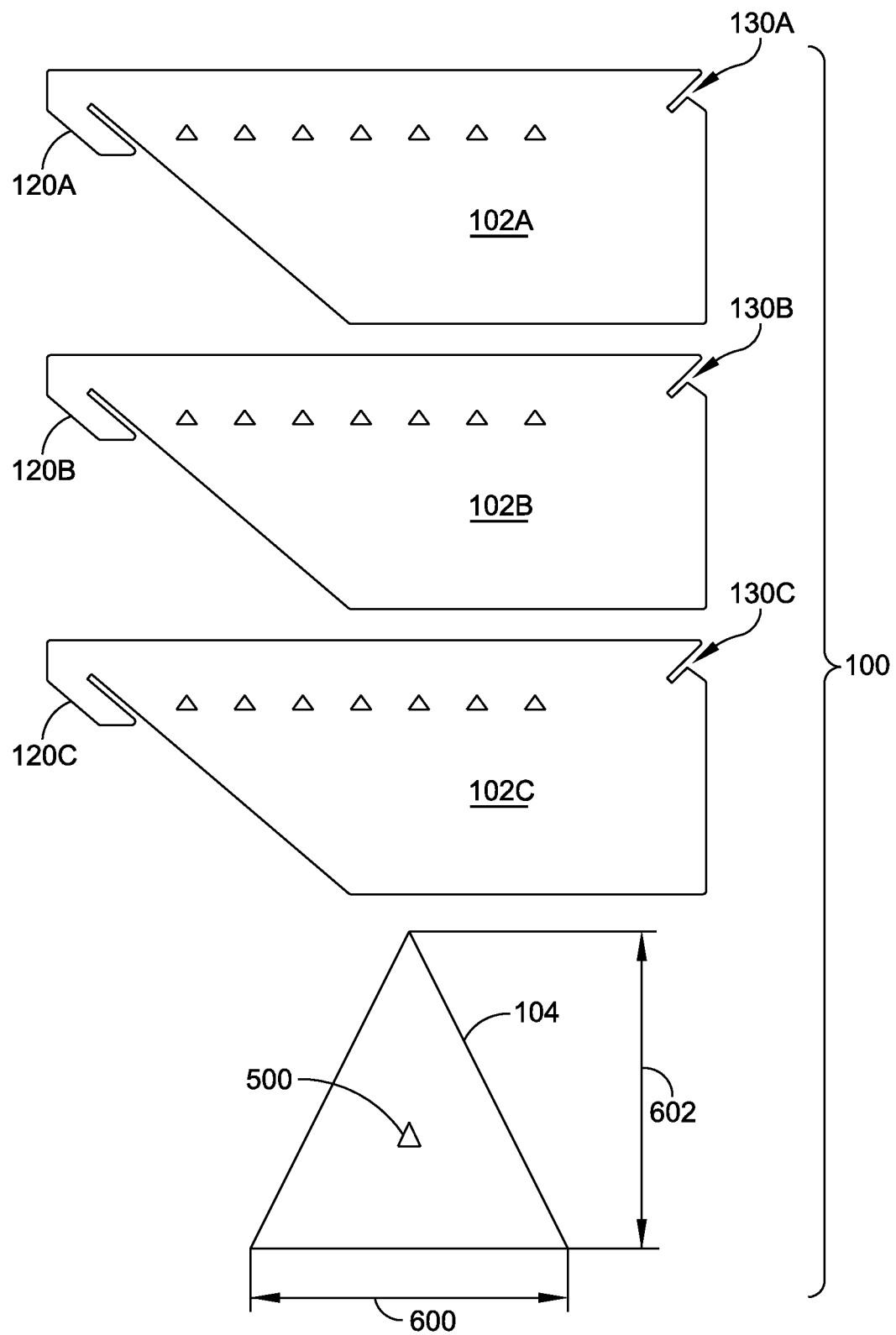
FIG. 6 gives side views of the three side plates and the floor plate of the pyramid fire pit of FIG. 2.

FIG. 6 shows the firepit 100 disassembled. In one embodiment each of the three side plates has a top edge of about 39.22 inches, an intermediate edge of about 19.5 inches, and a bottom edge of about 19.5 inches. In this embodiment the floor plate has a base 600 of about 23 inches and a height 602 of about $19^{15}/_{16}$ inches. These dimensions are not critical, and a pyramid fire pit may be made larger or smaller as desired. For example, in a smaller embodiment the floor plate has a base 600 of about $16^{5}/_{16}$ inches and a height 602 of about $14^{1}/_{8}$ inches, and the side plates are scaled accordingly.

Figure 7:
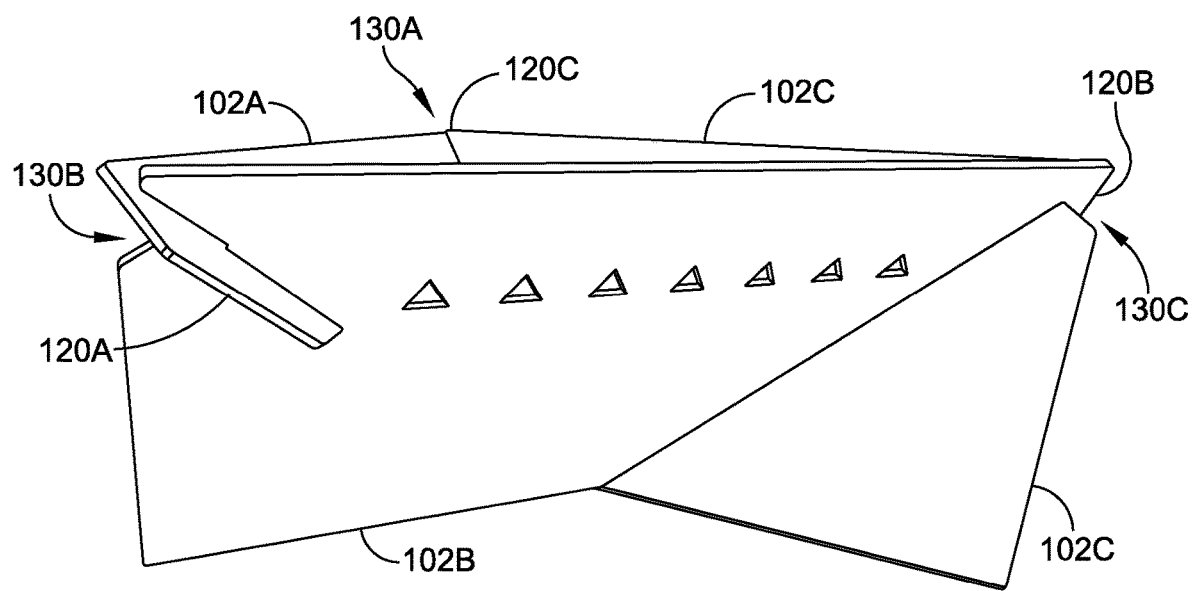
FIG. 7 is a side view of the pyramid fire pit of FIG. 2.
Figure 8:
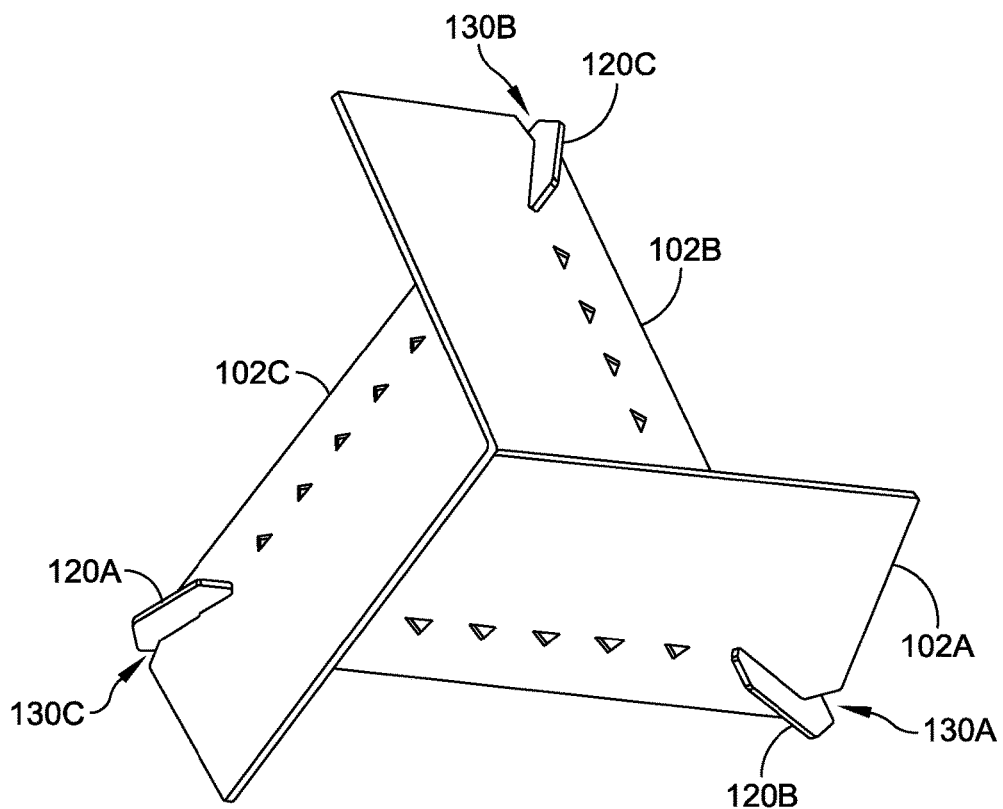
FIG. 8 is a bottom view of the pyramid fire pit of FIG. 2.
Figure 9:
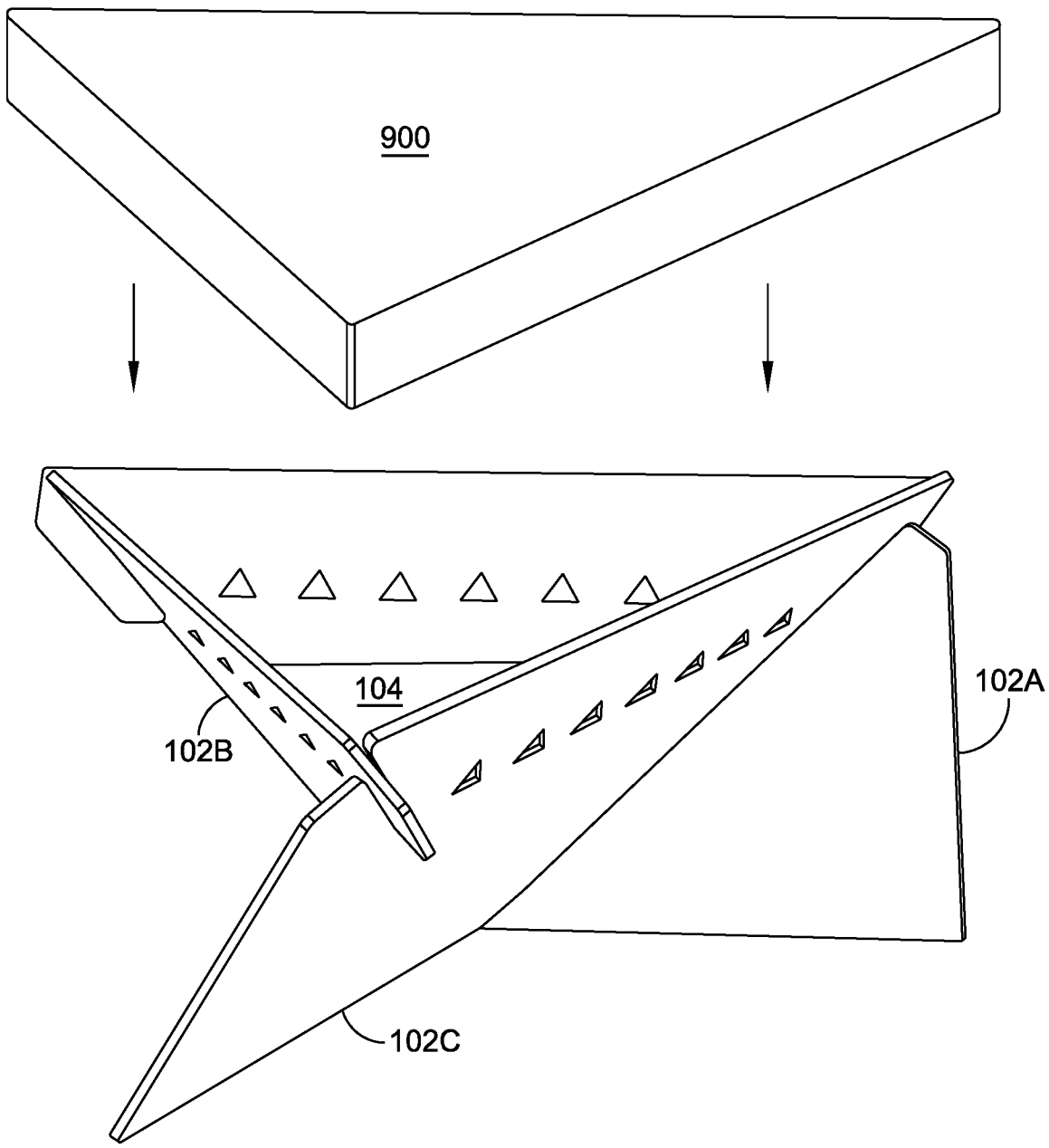
FIG. 9 is a perspective view of the pyramid fire pit of FIG. 2 with a cover.
Figure 10:
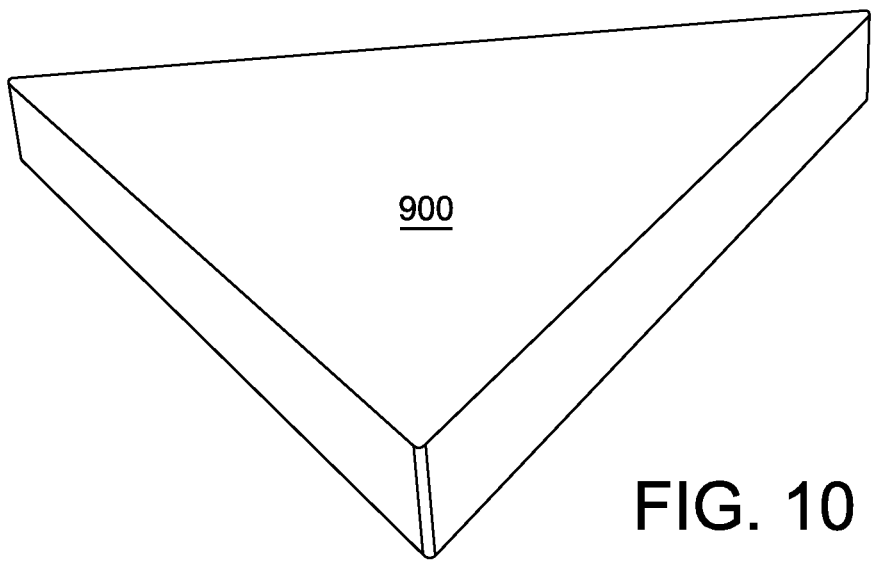
FIG. 10 is a top perspective view of the cover of FIG. 9.
Figure 11:
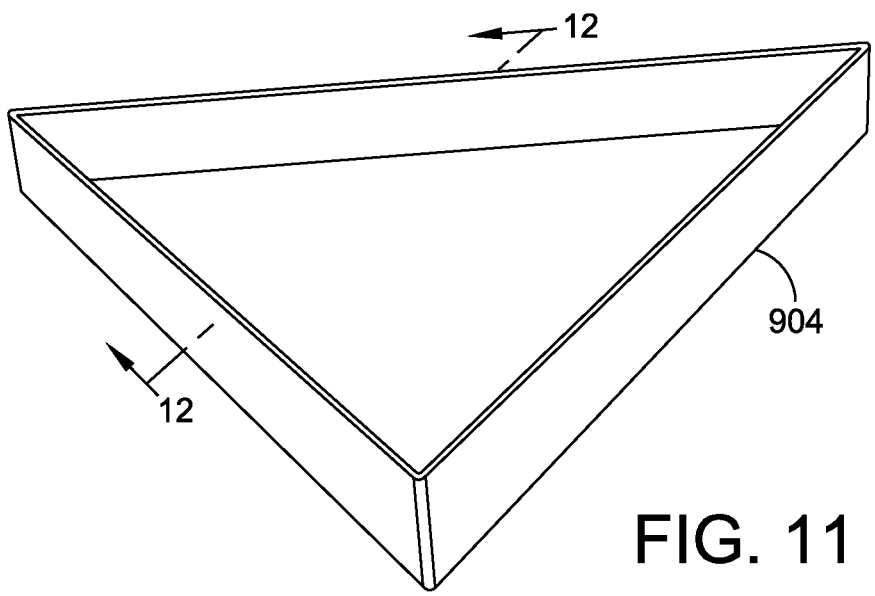
FIG. 11 is a bottom perspective view of the cover of FIG. 9.
Figure 12:
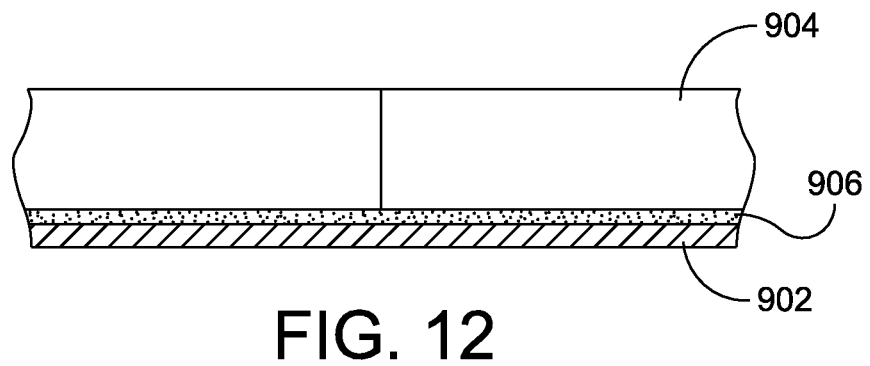
FIG. 12 is a section view taken along the line 12-12 of FIG. 11.
Figure 13:
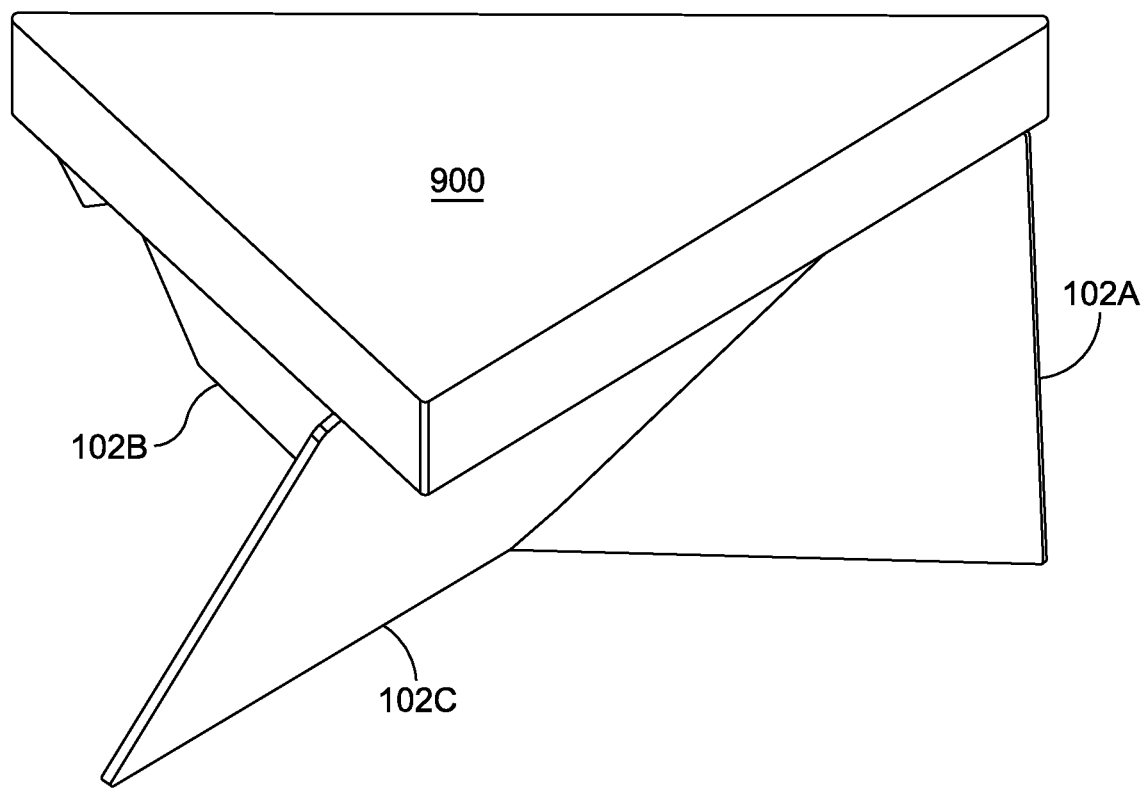
FIG. 13 is a perspective view of the cover of FIG. 9 on a pyramid fire pit.
Figure 14:
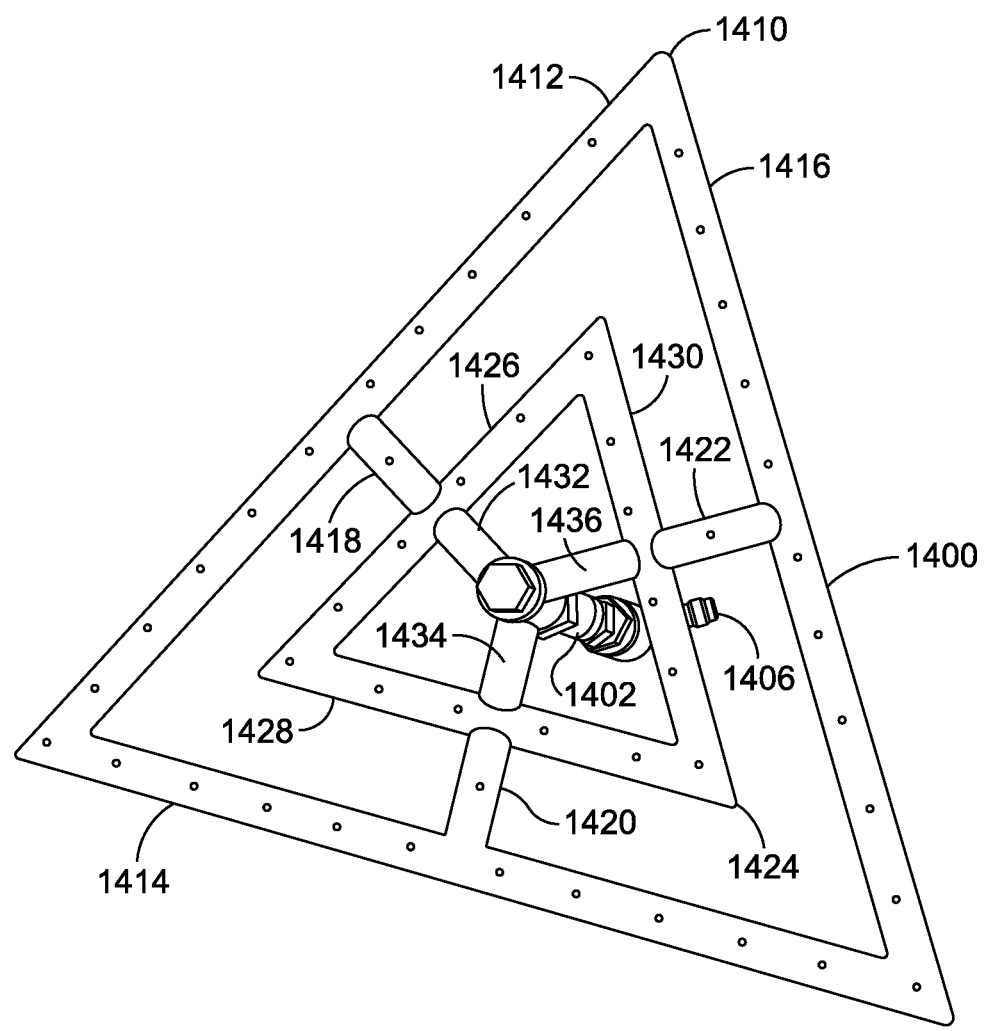
FIG. 14 is a perspective view of a gas burner that can be installed in the pyramid fire pit of FIG. 2.
Figure 15:
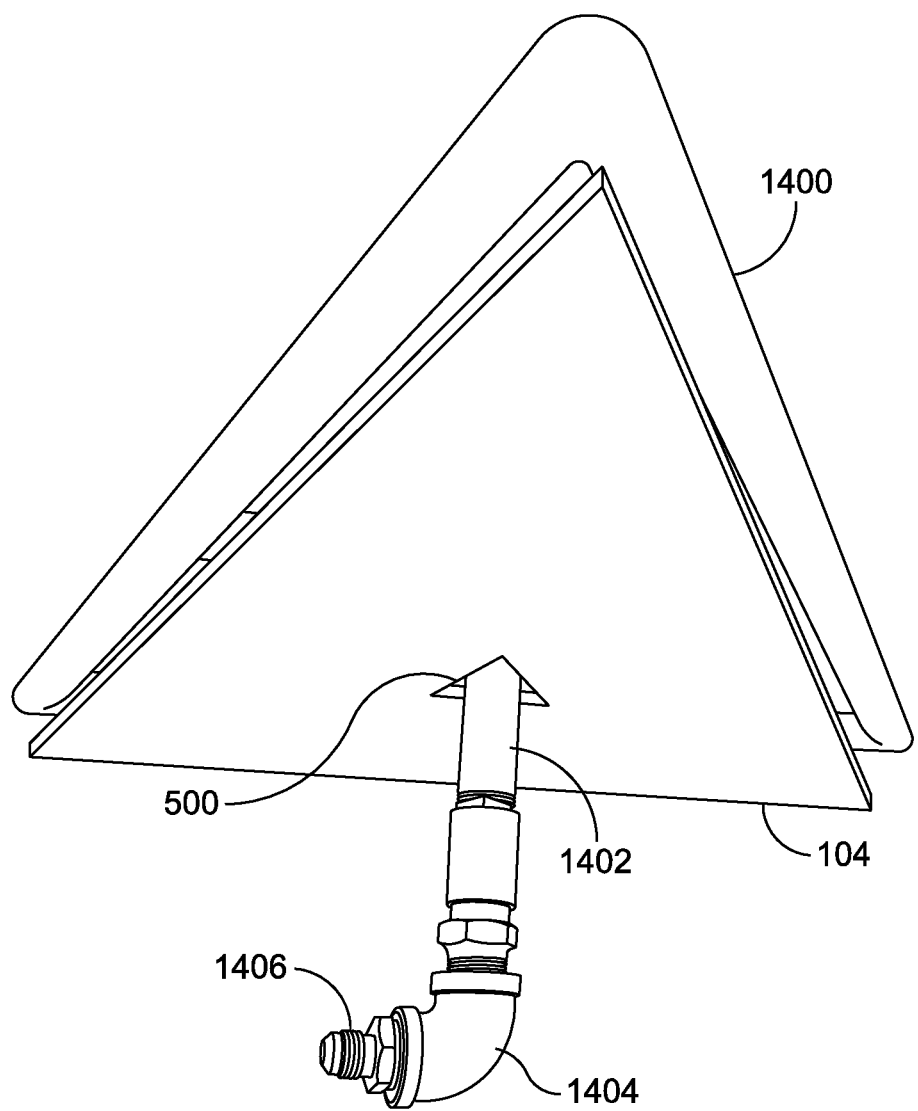
FIG. 15 is a bottom view of a portion of the pyramid fire pit of FIG. 2 with the gas burner of FIG. 14 installed.
Figure 16:
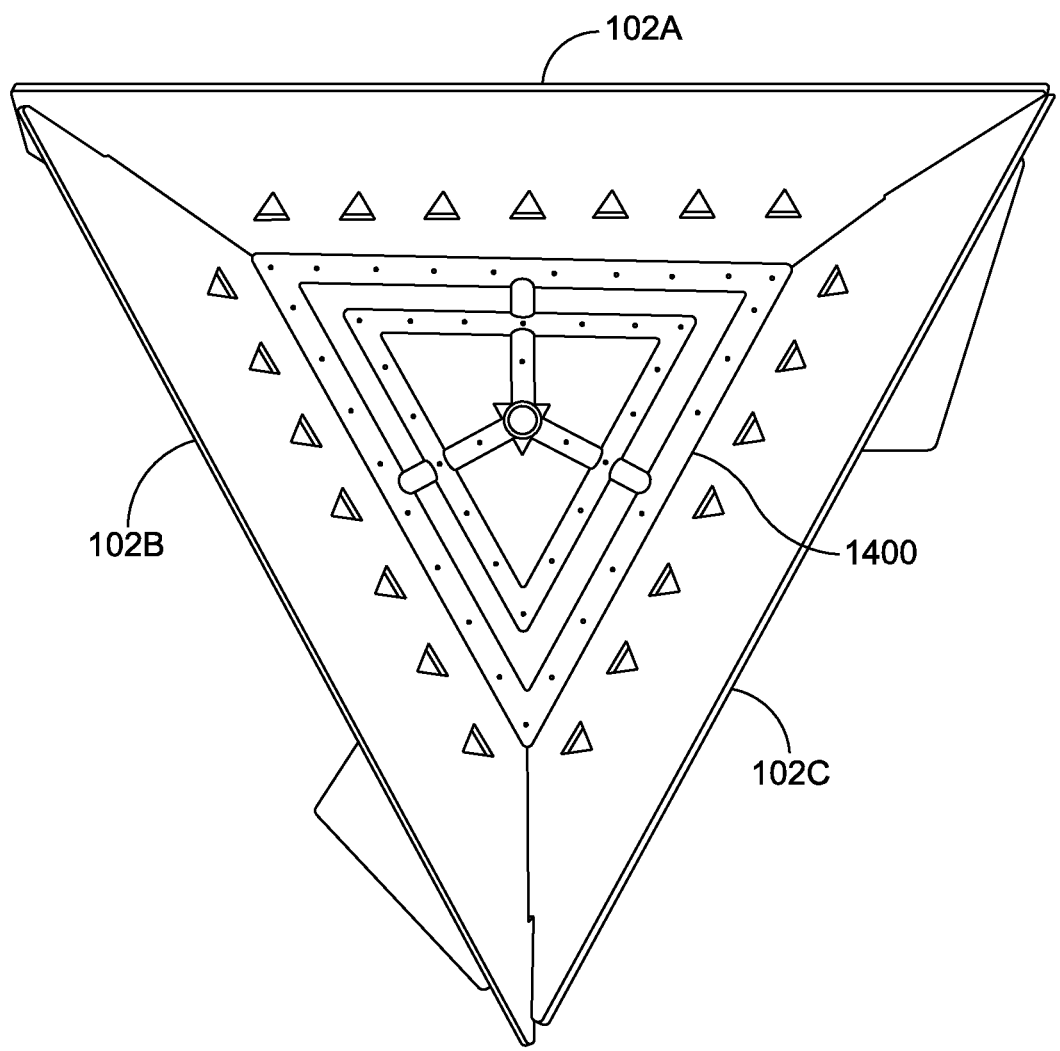
FIG. 16 is a top view of the pyramid fire pit of FIG. 2 with the gas burner of FIG. 14 installed.
Figure 17:
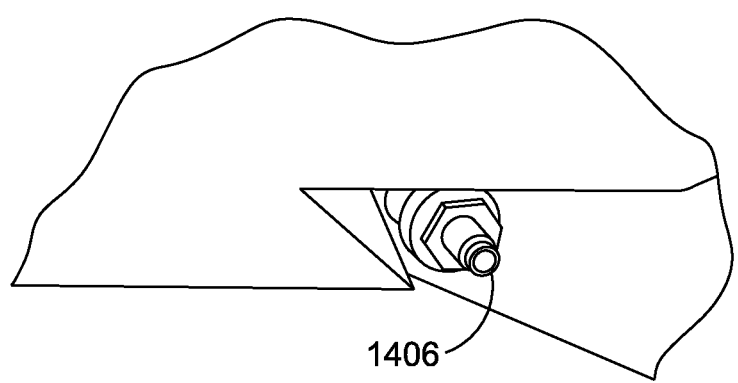
FIG. 17 is a perspective of a connector for the gas burner of FIG. 14.
Figure 18:
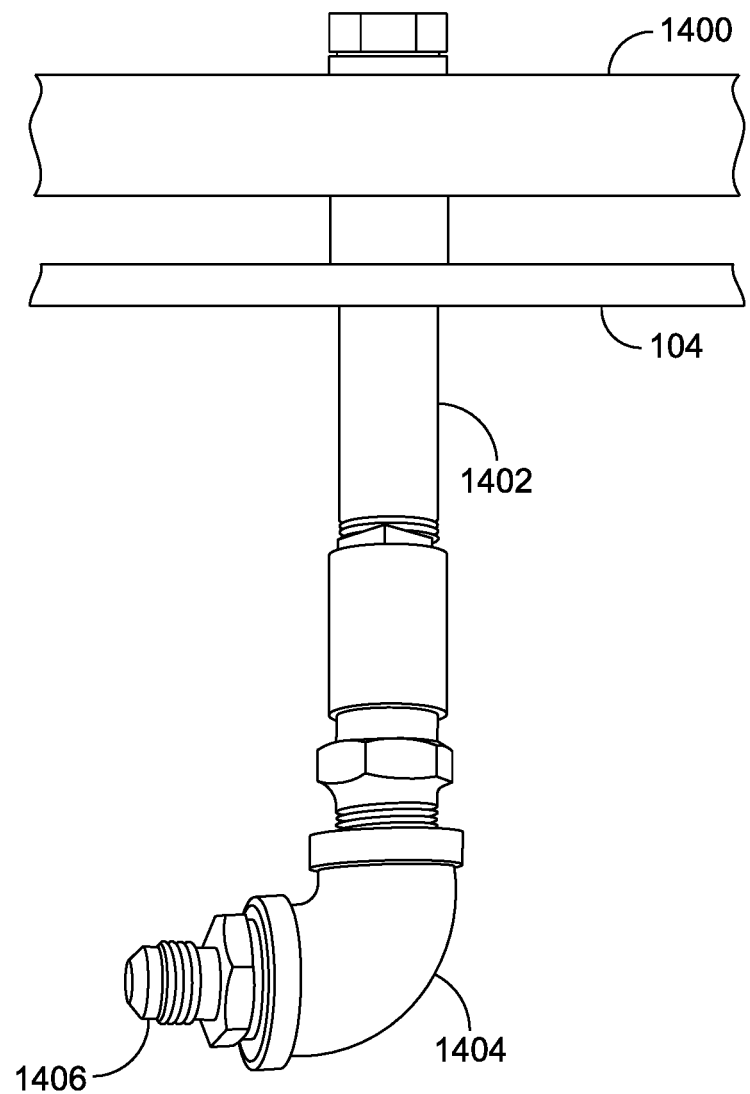
FIG. 18 is a perspective view of the connector of FIG. 17 with plumbing between the connector and the gas burner of FIG. 14.
Figure 19:
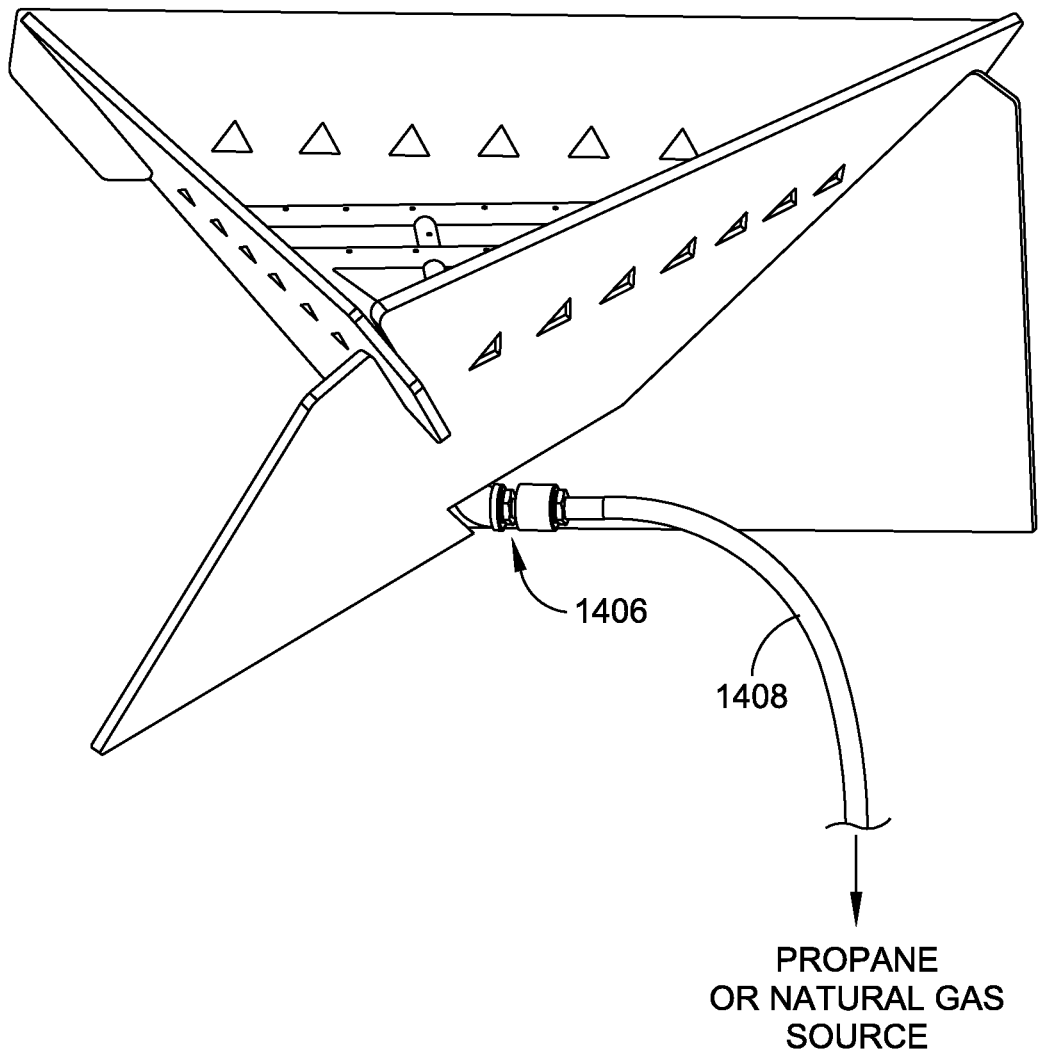
FIG. 19 is a perspective view of the pyramid fire pit and gas burner of FIG. 15 with a gas connector hose.

FIGS. 7 and 8 illustrate the assembly of the side plates and floor plate of the pyramid fire pit of FIG. 2. The first, second, and third side plates 102A, 102B, and 102C have been assembled by locking the hook 120A of the first side plate 102 into the slot 130B of the second plate 102B. Similarly, the hook 120B of the second plate 102B has been locked into the slot 130C of the third plate 102C, and the hook 120C of the third plate 102C has been locked into the slot 130A of the first plate 102A.

Referring again to FIGS. 1 and 2, when the three trapezoidal side plates 102A, 102B, and 102C are hooked together, an inverted triangular-pyramid-shaped cavity 103 is defined between them, the cavity 103 having an apex 105 at the bottom of the fire pit. FIG. 1 shows a wood fire in the cavity 103.

Some embodiments may include a cover that can be placed over the pyramid fire pit, as shown in FIGS. 9 through 13. A cover 900 is shaped as an equilateral triangle similar to the shape of the floor plate 104. The cover 900 has a top sheet 902 which may be sheet metal or other suitable material and a frame 904. The top sheet may be attached to the frame by welding 906, or by adhesive or any suitable hardware (not shown).

As noted previously, some embodiments may include a gas burner that may burn, for example, propane or natural gas. FIGS. 14 through 19 illustrate a generally triangular-shaped burner 1400 with a gas feed pipe 1402 that extends through the opening 500 in the floor plate 104, doubling as a center support for the burner. This triangular-shaped burner fits snugly and attractively within the pyramid fire pit, but the shape of the burner is not critical, and a burner of a different shape could be used. An elbow 1404, a nipple 1406, and other plumbing fittings as desired may be connected to the feed pipe 1402. A hose 1408 or rigid pipe (not shown) may be used for connection to a fuel source such as a propane tank or a natural gas connection.

In the embodiment shown, the gas burner includes two concentric pipe rings. An outer ring 1410 has a first arm 1412, a second arm 1414, and a third arm 1416 all in fluid communication. The arms 1412, 1414, and 1416 are supported by radial pipes 1418, 1420, and 1422, respectively, which establish fluid connections with an inner ring 1424. The inner ring 1424 has a first arm 1426, a second arm 1428, and a third arm 1430 all in fluid communication with each other and with the outer ring 1410 through the radial pipes 1418, 1420, and 1422. The arms 1426, 1428, and 1430 are supported by radial pipes 1432, 1434, and 1436, respectively, which establish fluid communication with the feed pipe 1402. The various arms and radial pipes have a plurality of orifices to allow gas to exit the arms for burning.

Figure 20:
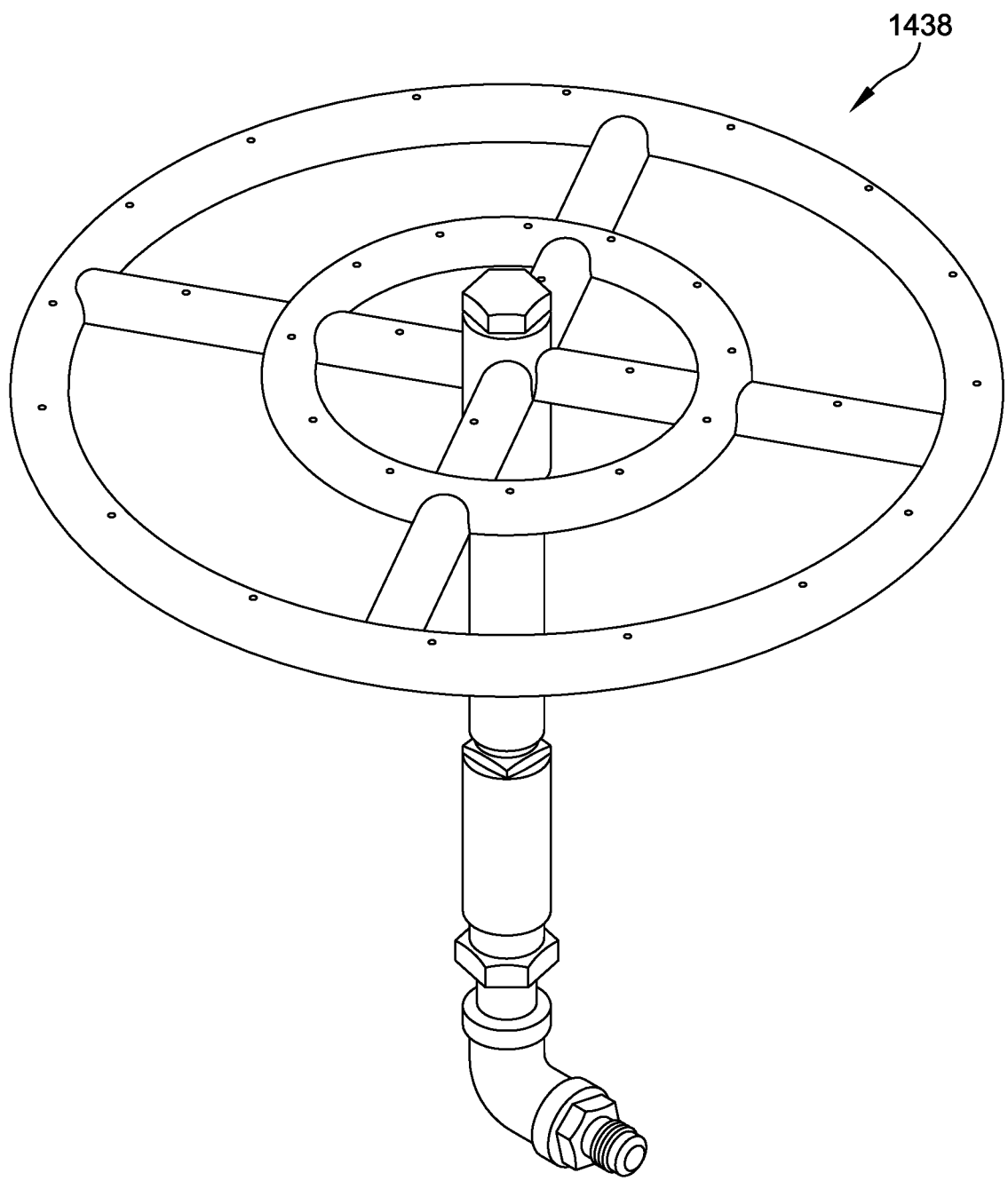
FIG. 20 is a perspective view of another embodiment of a gas burner that can be installed in the pyramid fire pit of FIG. 2.
Figure 21:
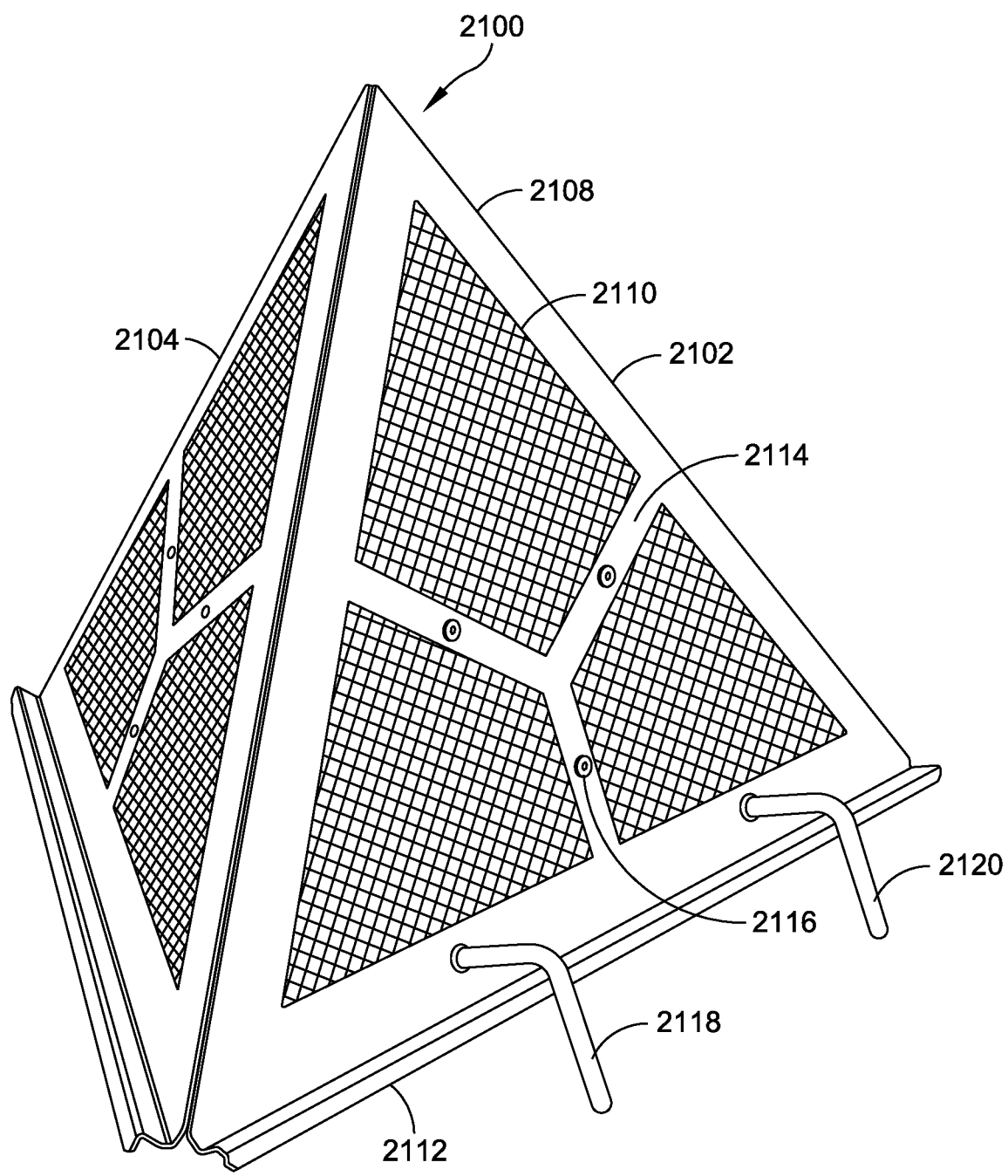
FIG. 21 is a perspective view of a spark arrestor that can be placed over the pyramid fire pit of FIG. 2.
Figure 22:
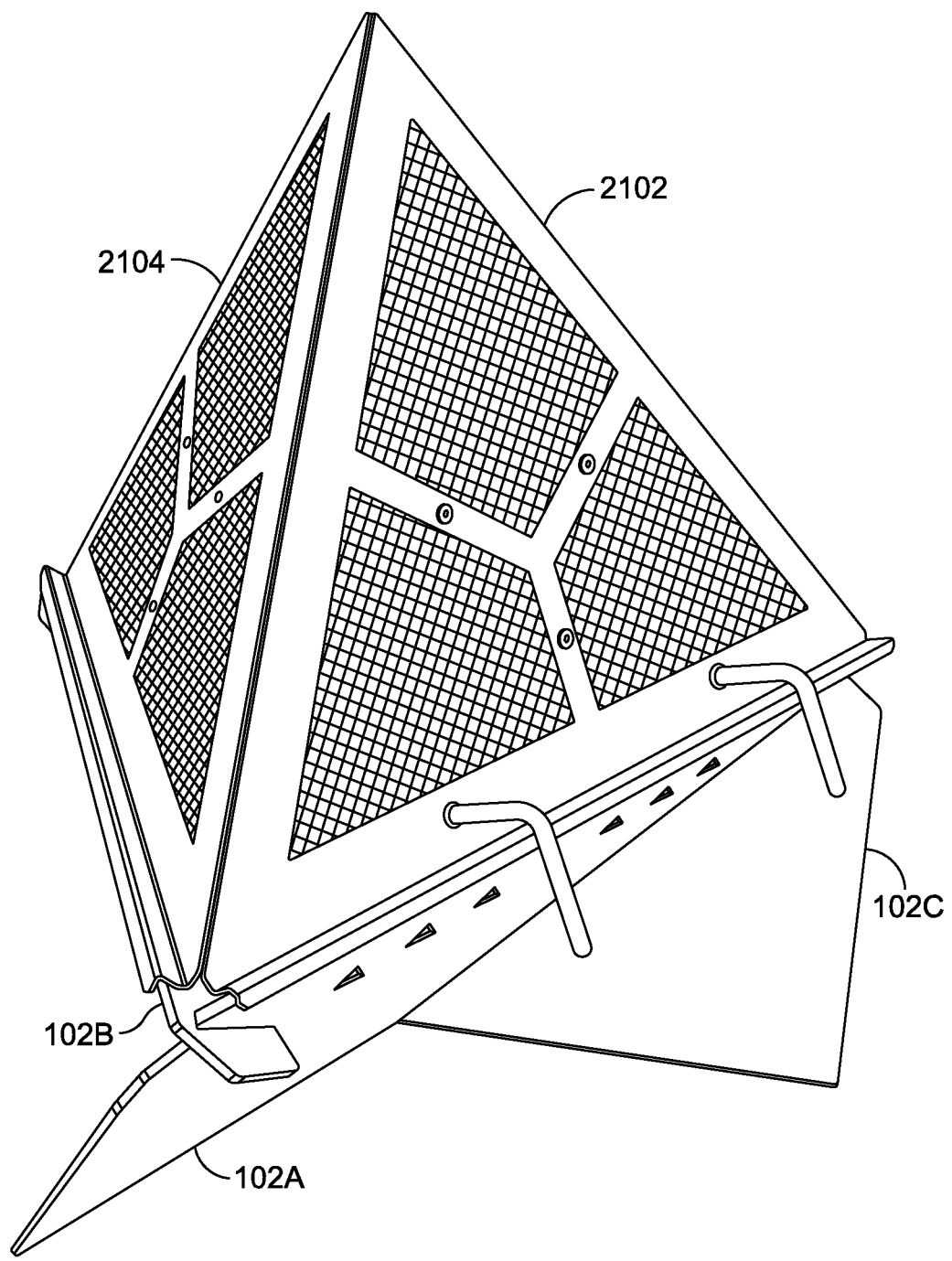
FIG. 22 is a perspective view of the spark arrestor of FIG. 21 in position on the pyramid fire pit of FIG. 2.
Figure 23:
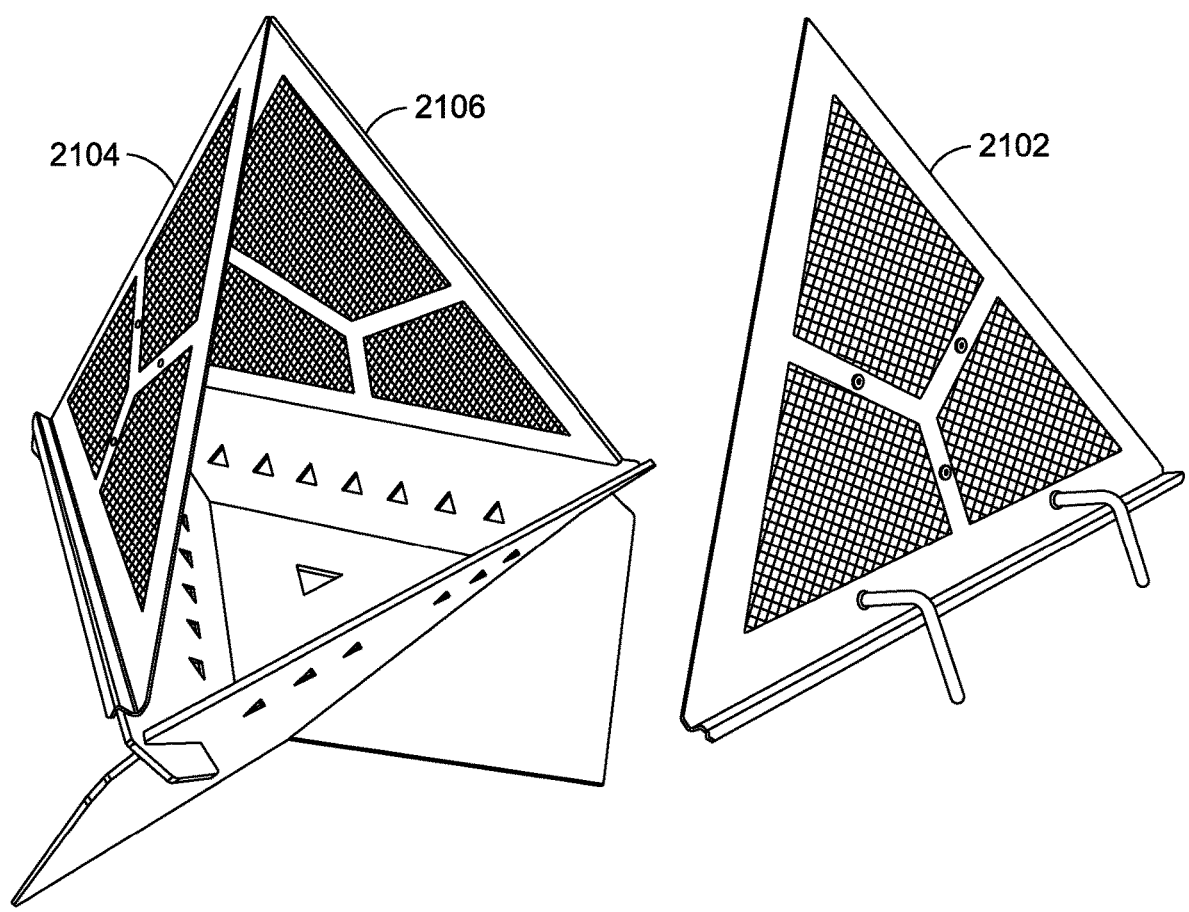
FIG. 23 is a perspective view of the embodiment of FIG. 22 showing one side of the spark arrestor detached.
Figure 24:
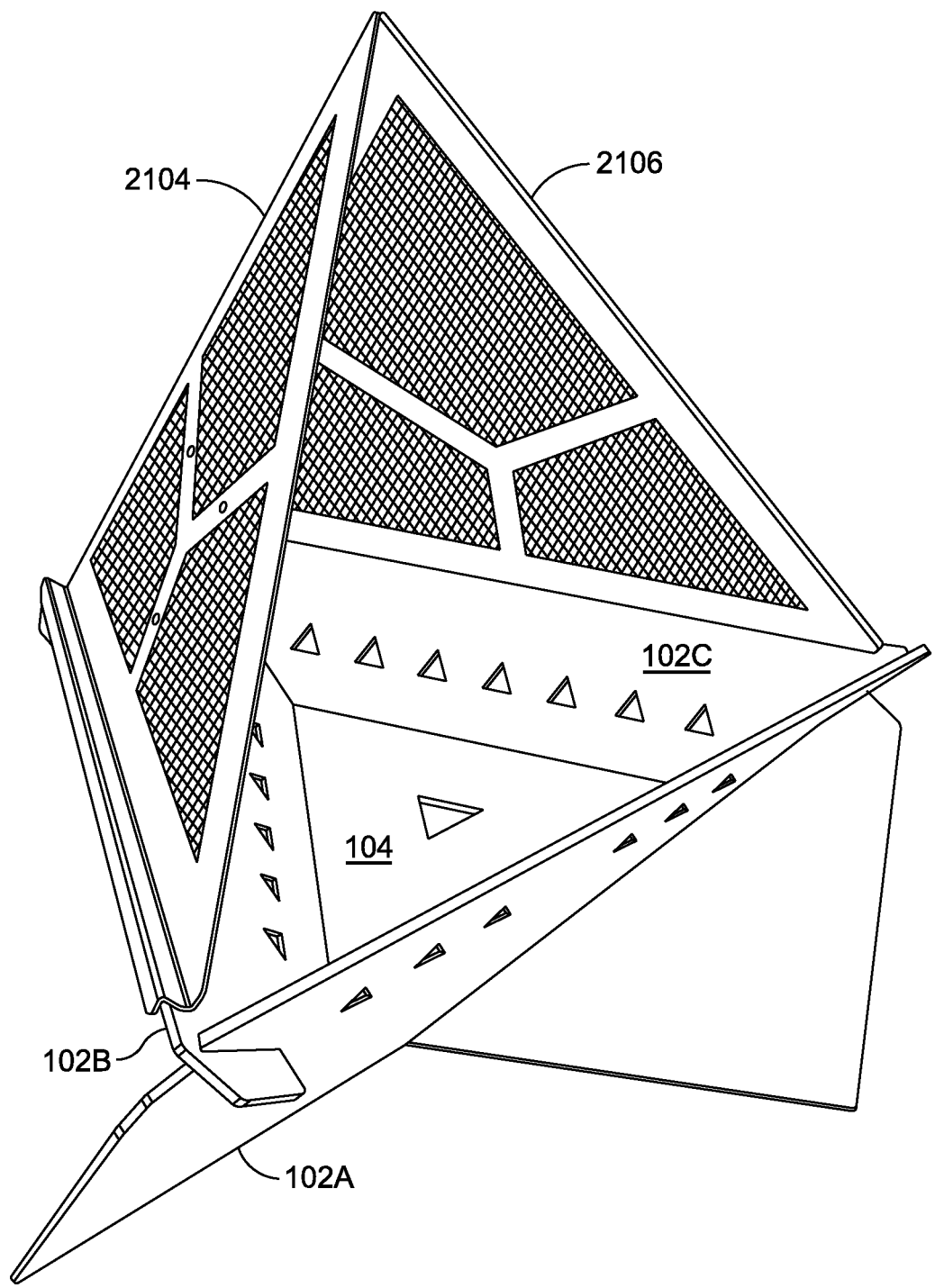
FIG. 24 is similar to FIG. 23 but omitting the detached side of the spark arrestor.
Figure 25:
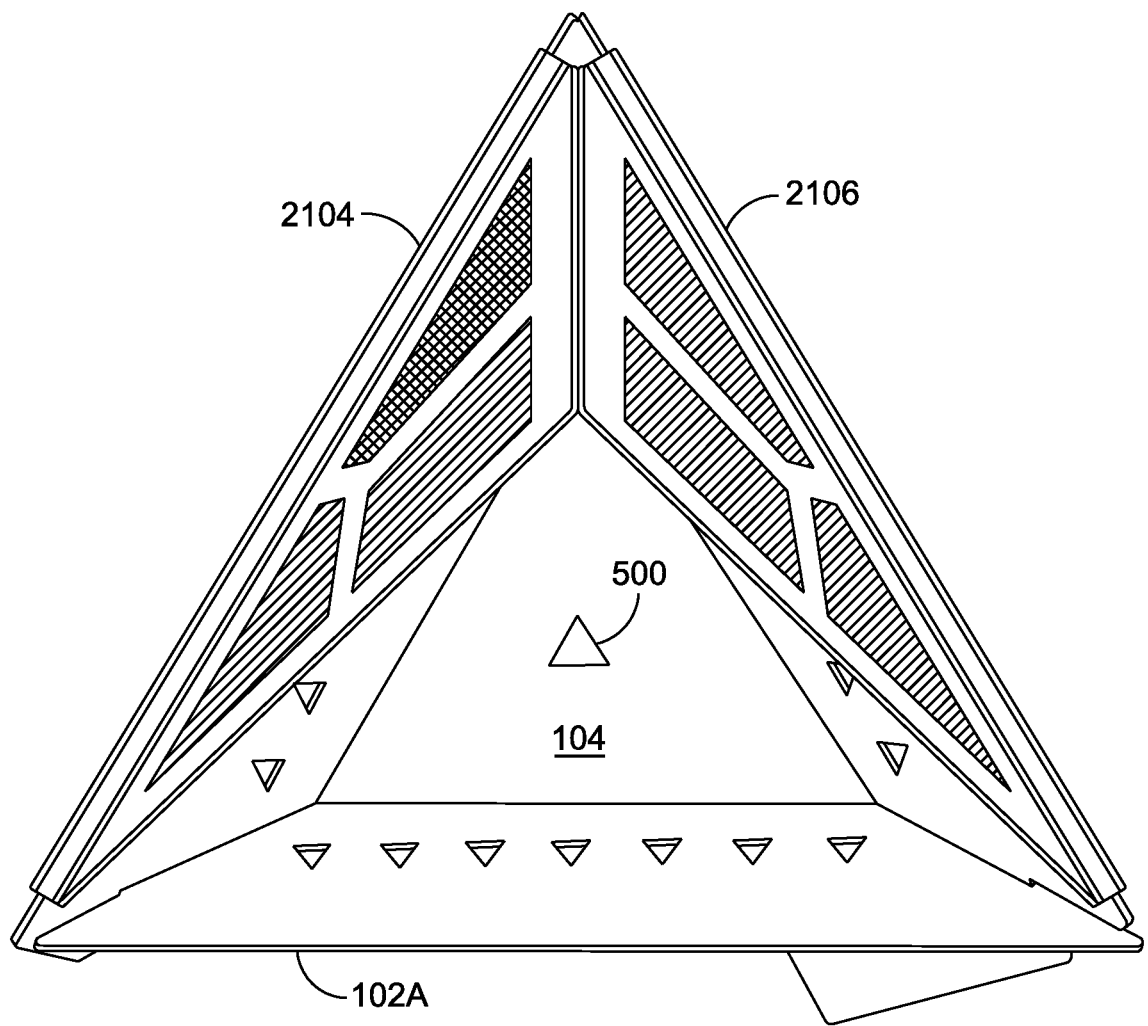
FIG. 25 is a top view of the embodiment of FIG. 24.
Figure 26:
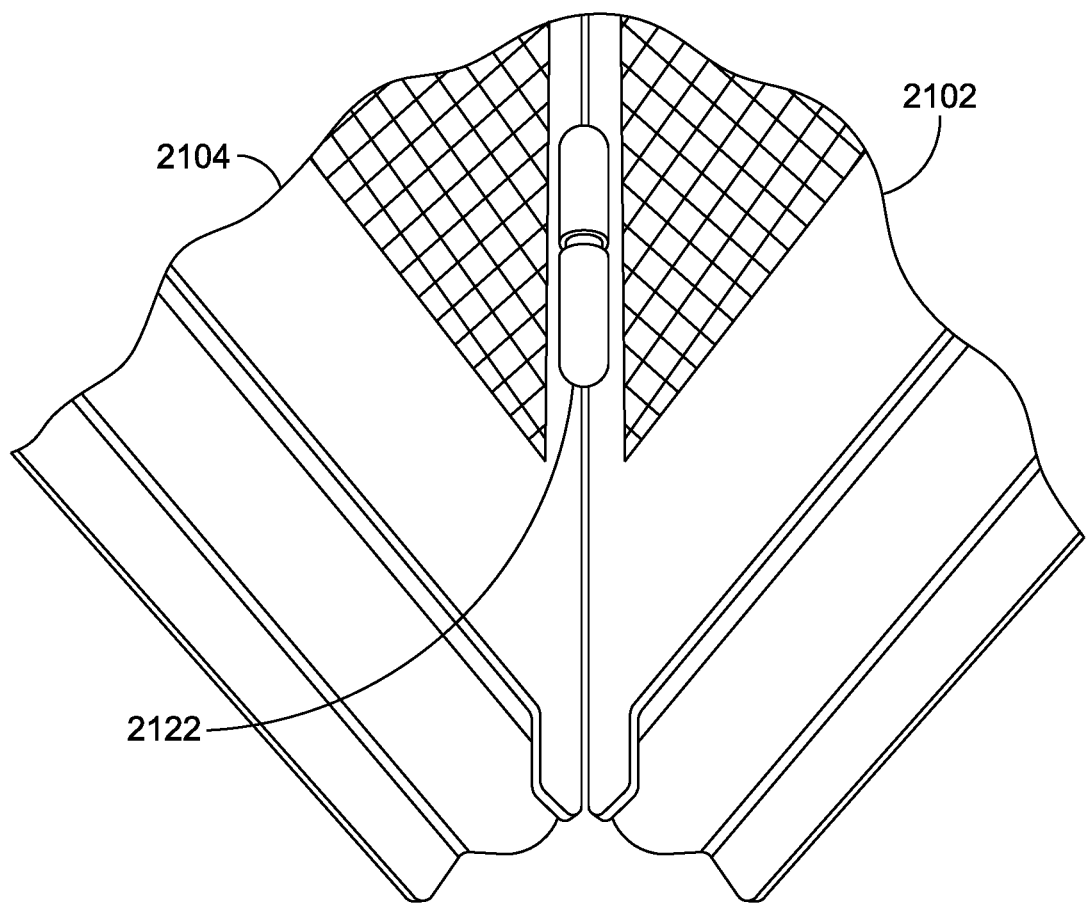
FIG. 26 is a detail view of the underside of the spark arrestor of FIG. 21 showing a hinge connecting two spark arrestor panels.

FIG. 20 shows an alternate embodiment of a gas burner in which orifices are formed in round concentric rings. Other plumbing configurations might be used as desired.

FIGS. 21 through 26 illustrate an embodiment of a spark arrestor generally 2100 that may be placed on the pyramid fire pit. The spark arrestor 2100 is formed of three triangular-shaped sides 2102, 2104, and 2106 that connect to each other to form a tetrahedron-shaped enclosure that sits on the fire pit. The side 2102 comprises an outer triangular frame 2108 that encloses a wire mesh 2110. The wire mesh 2110 permits air, light, and heat to pass through while preventing burning embers and sparks from exiting the fire pit. The frame 2108 has a lower lip 2112 shaped to fit over the upper edge of one side of the fire pit. The frame 2108 may also have one or more ribs 2114 for additional strength, attached to the wire mesh with screws 2116 or other suitable fasteners.

The sides 2104 and 2106 each are similar to the side 2102. However, the side 2102 may optionally be fitted with handles 2118 and 2120 to facilitate removal. The sides may be connected by one or more hinges such as a detachable hinge 2122. Hinges enable the spark arrestor 2100 to be folded flat when not in use. The detachable hinges that connect the side 2102 with the other sides permit the side 2102 to be removed so that a person looking at the fire over the first side plate 102A has a clear view whereas the other sides of the fire are enclosed by the spark arrestor.

Figure 27:
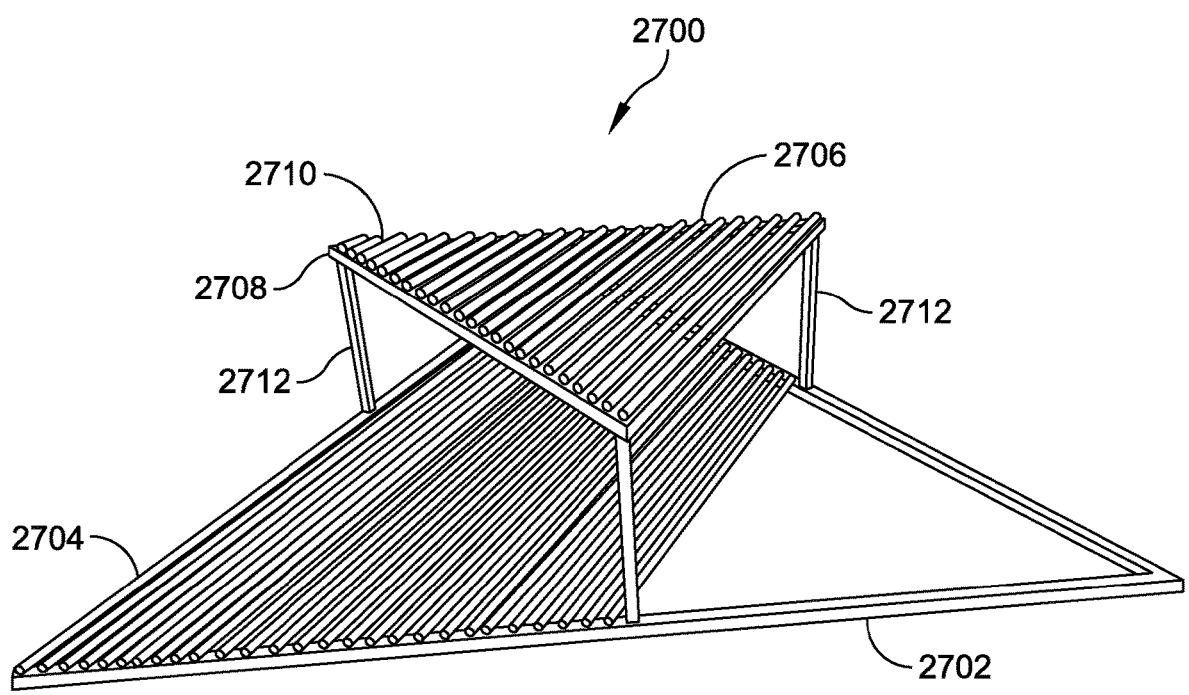
FIG. 27 is a perspective view of a cooking grate that can be placed on top of the pyramid fire pit of FIG. 2.
Figure 28:
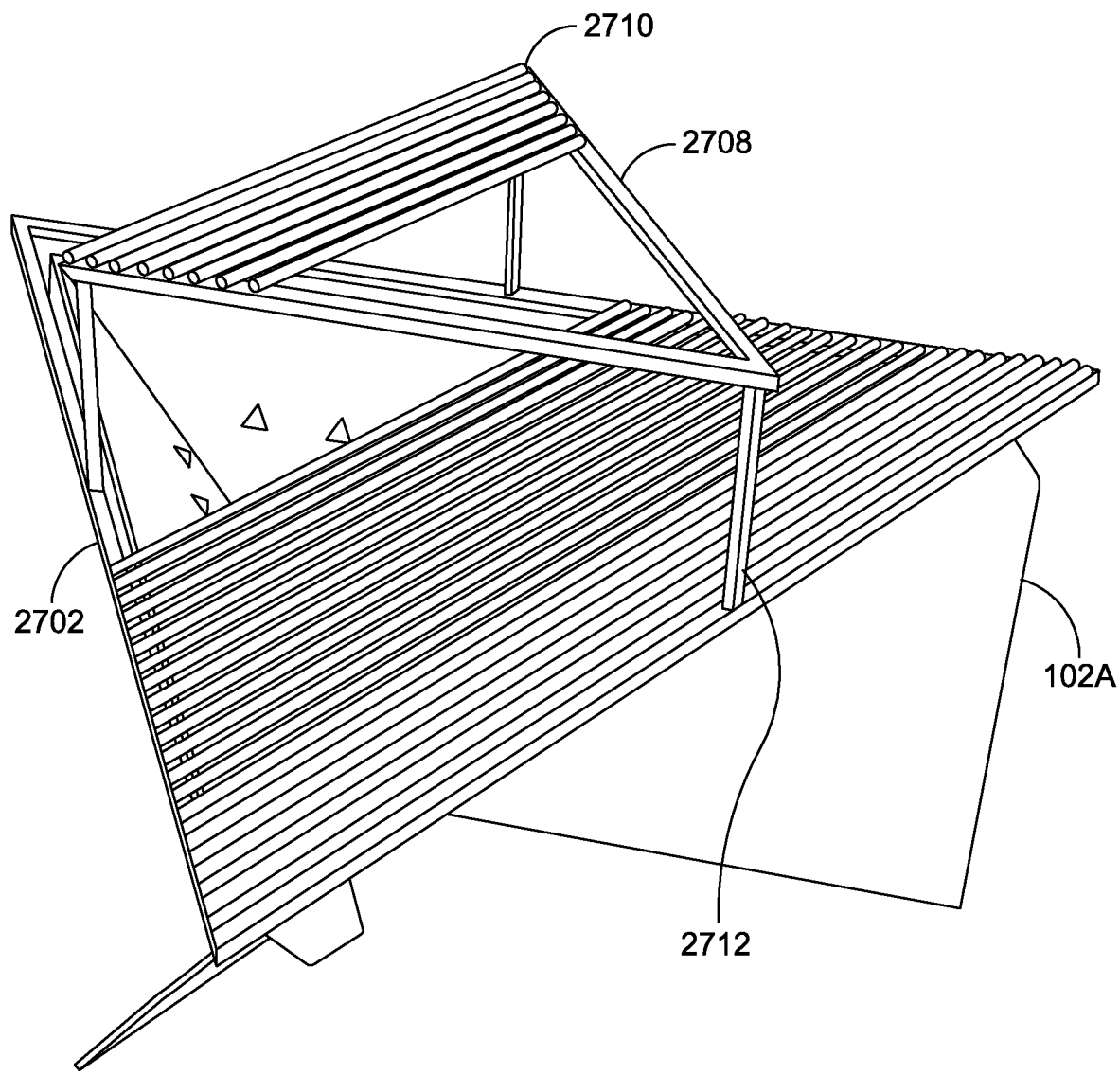
FIG. 28 is a perspective view of the cooking grate of FIG. 27 in position on the pyramid fire pit of FIG. 2.

FIGS. 27 and 28 illustrate an embodiment of a grill generally 2700 that may be placed on the fire pit. The grill has a frame 2702 shaped and sized to fit over the upper edges of the three sides of the fire pit. The frame 2702 supports a plurality of grill members 2704 that cover a portion of the frame. In some embodiments the grill members cover the entire frame. Some embodiments also include an auxiliary upper grill 2706. The auxiliary grill 2706 has a frame 2708 and a plurality of grill members 2710 that cover part or all of the frame 2708. The frame 2708 is supported one or a few inches above the frame 2702 by support rods 2712. The support rods may be permanently attached to the frames 2702 and 2708, or the rods may be detachable.

Embodiments of one or more components of the fire pit may be made partially or entirely of sheet steel, as noted above. Other fireproof materials may also be used such as, for example, aluminum, titanium for greater strength, or a composite material for lower weight. In this regard, one or more of the side plates may be made of a lighter weight material, and the floor plate may be made of a stronger or heavier material.

A pyramid fire pit as described and illustrated provides a triangular setup. The pieces connect at the corners using angles and gravity to hold the pieces or components in place. Due to the triangular shape, there are fewer pieces than in other portable fire pits, resulting in a reduction in weight when compared to other fire pits. The venting through the sides, and venting through the floor, aid in starting the fire and supporting and keeping the fire burning in the pit.

Embodiments of pyramid fire pits offer portability and ease of set up and take down. The three side plates are assembled by connecting the hooks and slots as described above. Optionally, a gas burner may be inserted through the hole in the floor plate and a spark arrestor or a grill may be placed over the fire pit as desired. To disassemble, first any spark arrestor or grill is removed, the spark arrestor is folded flat, any gas burner is removed, the floor plate is removed, and the three side plates are unhooked. All components (except the grill if it has a second grill attached) may then be folded flat or stood on edge for transport or storage. The storability of the pyramid fire pit allows for transportation to a desired outdoors location such as a beach, a forest, or a cabin. The triangular design reduces weight when compared with other designs, while maintaining integrity of the structure. The vent holes in the sides, and the cut-out hole in the floor plate, improve air flow to create maximum oxygen to the fire.

Some embodiments, such as shown in the figures, can provide a particularly attractive structure, built on a basic triangular pit but adding laterally extending, optionally planar, stabilizers from each of the side plates. In some embodiments, the grates are triangular which may complement and enhance appearance of the pit. Similarly, the spark arrestor can be triangular, which may also complement and enhance the appearance of the pit and, if utilized, one or more grates.

In some embodiments the three upper corners of the pit may nearly completely rise to the top edge of the pit. The lateral extensions of the plates extend to provide stabilizers. The stabilizers could be provided in other shapes such as with triangular or rounded outer edges or by low small rod-like extensions. These extensions could be removable from the central pit plates, such as with clips or fasteners.

An embodiment of a pyramid fire pit in which the three sides each have an upper edge of about 39.22 inches, and made of 0.25-inch steel, weighs about 145 pounds. In some embodiments there may be additional cut-outs in the three side plates; one purpose for these additional cut-outs can be to reduce weight.

In some embodiments, the vent holes in the plates are eliminated for certain applications, for example making biochar where it is desired to provide less oxygen to the fire.

Another accessory that may be added comprises a heat arresting separate horizontal plate, which may also be triangular, extending outwardly at least to or past a mating width of the upper edge of the pyramid fire pit. The entire fire pit can be mounted, or rested, on this heat arresting plate. This can allow the pit to be used on heat sensitive surfaces like wood, plastic, or composite decking.

Outside surfaces and edges, such as the upper edges of the pit, outer surface of the cover, etc., could have fireproof and insulating cladding such as Light weight insulated onyx aluminum honeycomb panel plate or other sufficiently fireproof composite, combinations of metal and composite or minerals, etc.

Although the embodiments described above are triangular, the principles of the pyramid fire pit can be used in structures with more sides than three. For example, a six-sided fire pit could be made using similar construction.

All dimensions and angles disclosed above can be varied for varying circumstances, uses, and objects. They may be varied by ranges of plus or minus 1% through up to 40% with the ranges in some embodiments varying by differing amounts for differing aspects of a given fire pit and fire pit application. Some embodiments may vary in size from 40% greater to as large as desired, such as 5000% greater or even more for massive firepits. Thus, this firepit design can be used to provide relatively economical and easy to transport and assemble such firepits.

The foregoing detailed description has described some specific embodiments. However, the illustrative discussions above are not intended to be exhaustive or to limit the invention to the precise forms disclosed. Many modifications and variations are possible in view of the above teachings. The embodiments were chosen and described in order to explain the principles of the present systems and methods and their practical applications, to thereby enable others skilled in the art to best utilize the present systems, their components, and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon." Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Unless otherwise indicated, all numbers or expressions, such as those expressing dimensions, physical characteristics, and the like, used in the specification (other than the claims) are understood to be modified in all instances by the term "approximately."

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from within minus 90% to plus 100% and thus provide support for claims that recite such values or any and all ranges or subranges that can be formed by such values. For example, a stated numerical value of 8 should be understood to be capable of varying from 0.8 (minus 90%) to 16 (plus 100%). The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

The foregoing description and the attached drawings are exemplary. The invention is to be limited only by the claims as finally allowed.

We claim:

1. A pyramid fire pit comprising:
   a first trapezoidal side plate having a first hook and a first slot defined in opposing upper corners;
   a second trapezoidal side plate having a second hook and a second slot defined in opposing upper corners; and
   a third trapezoidal side plate having a third hook and a third slot defined in opposing upper corners,
   the first hook locked into the second slot, the second hook locked into the third slot, and the third hook locked into the first slot whereby the three side plates define therebetween an inverted triangular pyramid-shaped cavity;
   wherein each side plate has an upper edge extending between its opposing upper corners, a lower edge shorter than the upper edge, a first intermediate edge forming approximately right angles with the upper and lower edges, and a second intermediate edge forming an acute angle with the upper edge and an obtuse angle with the lower edge.

2. The pyramid fire pit of claim 1 wherein:
   the first slot is formed in the first side plate adjacent the right angle between the upper and first intermediate edges; and
   the first hook is formed in the first side plate adjacent the acute angle between the upper and second intermediate edges.

3. The pyramid fire pit of claim 1 wherein the first side plate defines a plurality of air openings.

4. The pyramid fire pit of claim 1 wherein the three side plates comprise sheet steel.

5. The pyramid fire pit of claim 1 and further comprising a triangular-shaped floor plate sized to fit into the inverted pyramid-shaped cavity at an intermediate point between an apex of the cavity and a base of the cavity.

6. The pyramid fire pit of claim 5 wherein the floor plate defines an air opening.

7. The pyramid fire pit of claim 6 and further comprising:
   a gas burner element; and
   a support pipe coupled to the gas burner element and in fluid-flow connection with the gas burner element, the support pipe disposed in the opening in the floor plate.

8. A pyramid fire pit comprising:
   a first trapezoidal side plate having a first hook and a first slot defined in opposing upper corners;
   a second trapezoidal side plate having a second hook and a second slot defined in opposing upper corners; and
   a third trapezoidal side plate having a third hook and a third slot defined in opposing upper corners,
   the first hook locked into the second slot, the second hook locked into the third slot, and the third hook locked into the first slot whereby the three side plates define therebetween an inverted triangular pyramid-shaped cavity;
   a triangular-shaped floor plate (i) sized to fit into the inverted pyramid-shaped cavity at an intermediate point between an apex of the cavity and a base of the cavity; and (ii) defining an opening;
   a gas burner element comprising three straight pipes containing gas orifices, connected at their ends to define a triangular shape; and
   a support pipe coupled to the gas burner element and in fluid-flow connection with the gas burner element, the support pipe disposed in the opening in the floor plate.

9. The pyramid fire pit of claim 1 and further comprising a triangular cover sized to fit over the upper edges of the three side plates.

10. The pyramid fire pit of claim 1 and further comprising a triangular grill sized to fit over the upper edges of the three side plates, the grill comprising a frame and a plurality of grill elements disposed across the frame.

11. A pyramid fire pit comprising:
    a first trapezoidal side plate having a first hook and a first slot defined in opposing upper corners;
    a second trapezoidal side plate having a second hook and a second slot defined in opposing upper corners; and
    a third trapezoidal side plate having a third hook and a third slot defined in opposing upper corners,
    the first hook locked into the second slot, the second hook locked into the third slot, and the third hook locked into the first slot whereby the three side plates define therebetween an inverted triangular pyramid-shaped cavity;
    a triangular grill sized to fit over the upper edges of the three side plates, the grill comprising a frame and a plurality of grill elements disposed across the frame; and
    an auxiliary grill supported above the triangular grill by a plurality of support rods that rest on the frame of the triangular grill.

12. The pyramid fire pit of claim 11 wherein the auxiliary grill is triangular in shape.

13. The pyramid fire pit of claim 1 and further comprising a triangular pyramid-shaped spark arrestor shaped to fit over the upper edges of the three side plates.

14. A pyramid fire pit comprising:
    a first trapezoidal side plate having a first hook and a first slot defined in opposing upper corners;
    a second trapezoidal side plate having a second hook and a second slot defined in opposing upper corners; and
    a third trapezoidal side plate having a third hook and a third slot defined in opposing upper corners,
    the first hook locked into the second slot, the second hook locked into the third slot, and the third hook locked into the first slot whereby the three side plates define therebetween an inverted triangular pyramid-shaped cavity; and
    a triangular pyramid-shaped spark arrestor shaped to fit over the upper edges of the three side plates and comprising three triangular-shaped panels each having a frame and a wire mesh disposed in the frame.

15. The pyramid fire pit of claim 14 and further comprising a detachable hinge connecting a first one of the panels with a second one of the panels.

16. The pyramid fire pit of claim 14 wherein a first one of the panels has a lower lip shaped to fit over the upper edge of one of the trapezoidal side plates.

* * * * *